(12) United States Patent
Whear et al.

(10) Patent No.: US 12,215,228 B2
(45) Date of Patent: *Feb. 4, 2025

(54) SEPARATORS, BATTERIES, SYSTEMS, AND METHODS FOR IDLE START STOP VEHICLES

(71) Applicant: Daramic, LLC, Charlotte, NC (US)

(72) Inventors: J. Kevin Whear, Utica, KY (US); John R. Timmons, Owensboro, KY (US); Jeffrey K. Chambers, Piney Flats, TN (US); Tejas R. Shah, Burlington, MA (US)

(73) Assignee: Daramic, LLC, Charlotte, NC (US)

( * ) Notice: Subject to any disclaimer, the term of this patent is extended or adjusted under 35 U.S.C. 154(b) by 208 days.

This patent is subject to a terminal disclaimer.

(21) Appl. No.: 17/678,503

(22) Filed: Feb. 23, 2022

(65) Prior Publication Data
US 2022/0186029 A1      Jun. 16, 2022

Related U.S. Application Data

(62) Division of application No. 17/463,116, filed on Aug. 31, 2021, which is a division of application No.
(Continued)

(51) Int. Cl.
*C08L 89/00*      (2006.01)
*H01M 10/10*      (2006.01)
(Continued)

(52) U.S. Cl.
CPC ............. *C08L 89/00* (2013.01); *H01M 10/10* (2013.01); *H01M 50/406* (2021.01);
(Continued)

(58) Field of Classification Search
CPC ..... C08L 89/00; H01M 10/10; H01M 50/406; H01M 50/417; H01M 50/44;
(Continued)

(56) References Cited

U.S. PATENT DOCUMENTS 1,529,839 A    3/1925    Lunn
3,351,495 A    11/1967   Bowie et al.
(Continued)

FOREIGN PATENT DOCUMENTS

| EP | 1533861 | 5/2007 |
| JP | 2008108511 | 5/2008 |
| WO | WO9420995 | 9/1994 |

OTHER PUBLICATIONS

Werner Bohnsted, "Aspects of Optimizing Polyethylene Separators", Journel of Power Sources, Elsevier, Amsterdam, NL, vol. 95, No. 1-2, Mar. 15, 2001 (pp. 234-240).
(Continued)

*Primary Examiner* — Michael L Dignan
(74) *Attorney, Agent, or Firm* — Hammer & Associates, P.C.

(57) ABSTRACT

In accordance with at least selected embodiments or aspects, the present invention is directed to improved, unique, and/or high performance ISS lead acid battery separators, such as improved ISS flooded lead acid battery separators, ISS batteries including such separators, methods of production, and/or methods of use. The preferred ISS separator may include negative cross ribs and/or PIMS minerals. In accordance with more particular embodiments or examples, a PIMS mineral (preferably fish meal, a bio-mineral) is provided as at least a partial substitution for the silica filler component in a silica filled lead acid battery separator (preferably a polyethylene/silica separator formulation). In accordance with at least selected embodiments, the present invention is directed to new or improved batteries, separators, components, and/or compositions having heavy metal removal capabilities and/or methods of manufacture and/or methods of use thereof.

20 Claims, 33 Drawing Sheets

Advantages of the Daramic PE Separator

Related U.S. Application Data

16/142,158, filed on Sep. 26, 2018, now Pat. No. 11,104,804, which is a division of application No. 13/239,483, filed on Sep. 22, 2011, now Pat. No. 10,119,025.

(60) Provisional application No. 61/532,598, filed on Sep. 9, 2011, provisional application No. 61/385,285, filed on Sep. 22, 2010.

(51) Int. Cl.
*H01M 50/406* (2021.01)
*H01M 50/417* (2021.01)
*H01M 50/44* (2021.01)
*H01M 50/463* (2021.01)
*H01M 50/429* (2021.01)

(52) U.S. Cl.
CPC ......... *H01M 50/417* (2021.01); *H01M 50/44* (2021.01); *H01M 50/463* (2021.01); *H01M 50/429* (2021.01); *Y02E 60/10* (2013.01); *Y02T 10/70* (2013.01)

(58) Field of Classification Search
CPC .. H01M 50/463; H01M 50/429; H01M 10/12; H01M 50/446; H01M 10/52; H01M 50/411; H01M 2220/20; Y02E 60/10; Y02T 10/70; Y02P 70/50
See application file for complete search history.

(56) References Cited

U.S. PATENT DOCUMENTS

| | | | |
|---|---|---|---|
| 3,457,112 A | 7/1969 | Harald | |
| 4,216,281 A * | 8/1980 | O'Rell | H01M 50/414 |
| | | | 429/252 |
| 4,440,838 A * | 4/1984 | Schmidt | H01M 50/414 |
| | | | 429/250 |
| 4,664,992 A | 5/1987 | Edwards et al. | |
| 4,927,722 A | 5/1990 | Bohnstedt et al. | |
| 5,336,573 A * | 8/1994 | Zuckerbrod | H01M 50/423 |
| | | | 429/252 |
| 5,478,677 A | 12/1995 | Choi et al. | |
| 5,618,642 A | 4/1997 | Samii et al. | |
| 5,985,484 A | 11/1999 | Young et al. | |
| 6,124,059 A * | 9/2000 | Bohnstedt | H01M 50/417 |
| | | | 428/319.1 |
| 6,242,127 B1 * | 6/2001 | Paik | H01M 50/443 |
| | | | 429/188 |
| 6,632,561 B1 | 10/2003 | Bauer et al. | |
| 7,094,498 B2 | 8/2006 | Miller et al. | |
| 2003/0224245 A1 | 12/2003 | Miller et al. | |
| 2006/0141350 A1 | 6/2006 | Drever et al. | |
| 2007/0026456 A1 | 2/2007 | Kamijo et al. | |
| 2007/0221567 A1 * | 9/2007 | Simmons | H01M 50/489 |
| | | | 210/500.36 |
| 2007/0264577 A1 * | 11/2007 | Katayama | H01M 50/414 |
| | | | 429/246 |
| 2008/0182933 A1 | 7/2008 | Shimizu et al. | |
| 2009/0030100 A1 | 1/2009 | Nagamatsu et al. | |
| 2012/0070714 A1 | 3/2012 | Chambers et al. | |
| 2012/0115008 A1 * | 5/2012 | Sano | H01M 50/451 |
| | | | 429/144 |

OTHER PUBLICATIONS

EP Extended Search Report dated Aug. 1, 2022; from EP counterpart Application No. 21210765.0.
U.S. Appl. No. 61/253,096, filed Oct. 20, 2009, Miller et al.
U.S. Appl. No. 12/904,371, filed Oct. 14, 2010, Miller et al.
K. Ihmels et al., "Chapter 7, Separator Materials for Valve-Regulated Lead-Acid Batteries," Elsevier B.V., 2004, D.A. J. Rand et al. editors, pp. 183-205.
Jorg Deiters et al., "A New Polyethylene Separator for Heavy-Duty Traction Batteries," Journal of Power Sources_158 (2006), Elsevier B.V., pp. 1069-1072.
M.L. Sorita et al., "Development of High Power VRLA Batteries Using Novel Materials and Processes," Journal of Power Sources 5111 (2002), Elsevier B.V., pp. 1-12.
M. Perrin et al., "Effect of Compression on the Behaviour of Lead-Acid Batteries," Journal of Power Sources 4071 (2000), Elsevier B.V., pp. 1-12.
M. Perrin et al., "Extending Cycle Life of Lead Acid Batteries: A New Separation System Allows the Application of Pressure on the Plate Group," Reference info not available.
Kim and Mendis, "Bioactive compounds from marine processing byproducts—A review." Food Research International 39 (2006) 386-393, accepted Oct. 2005 (Year: 2006).

* cited by examiner

Battery Functionality

- Starting, Lighting and Ignition (SLI)
  - ◆ Cold Start – High Power
  - ◆ Emergency Lighting – Infrequent, Shallow Discharge
  - ◆ Normal State of Charge: 100%

- Micro Hybrid
  - ◆ Cold Start – High Power
  - ◆ Regenerative Braking – Charge Acceptance
  - ◆ Multiple Hot Starts – Moderate Power
  - ◆ Electric Load w/ no IC – Frequent Moderate Cycling
  - ◆ Normal State of Charge: 40 to 80%

- Traction (Motive) Power
  - ◆ Long Duration Cycling – Regular, Deep Discharge
  - ◆ Normal State of Charge: 20 to 100%

Fig. 2

Micro-Hybrid: Flooded versus VRLA

| Characteristic | Flooded | Valve Regulated |
|---|---|---|
| Power Delivery (Restart) | + | ++ |
| Charge Acceptance (Braking) | + | ++ |
| Cycling (Battery Life) | + | ++ |
| Heat Resistance (Engine Compartment) | +++ | + |
| Safety | +++ | + |
| Cost | ~ € 125 / battery | ~ € 300 / Battery |

Fig. 3

W. Boehnstedt, et al, US Patent 6,124,059 (1998)

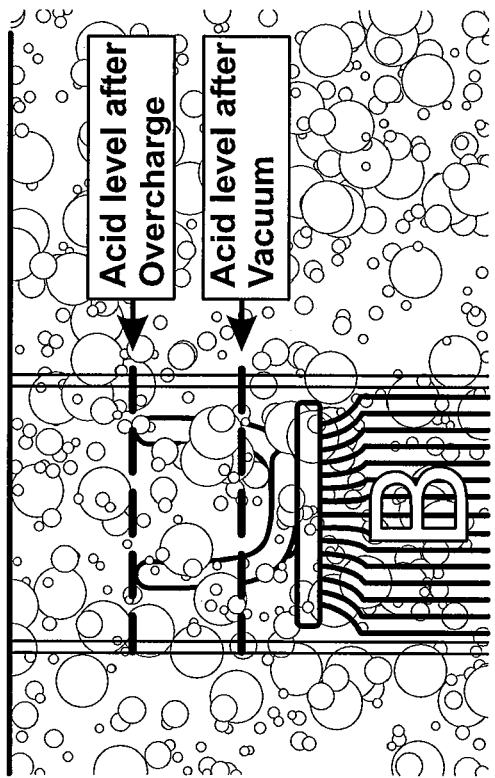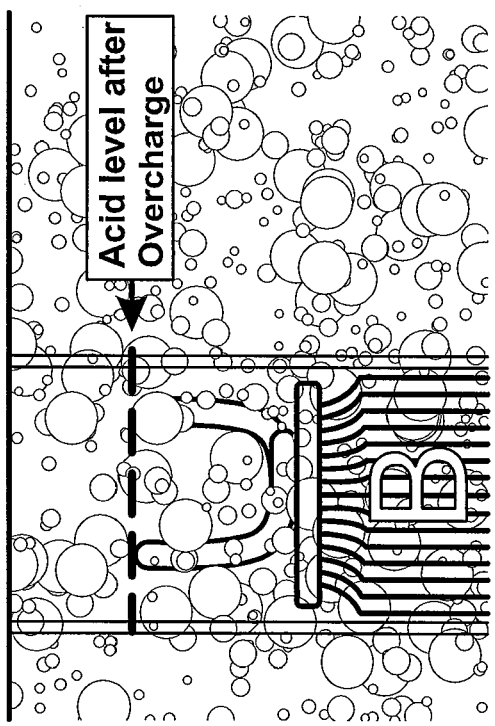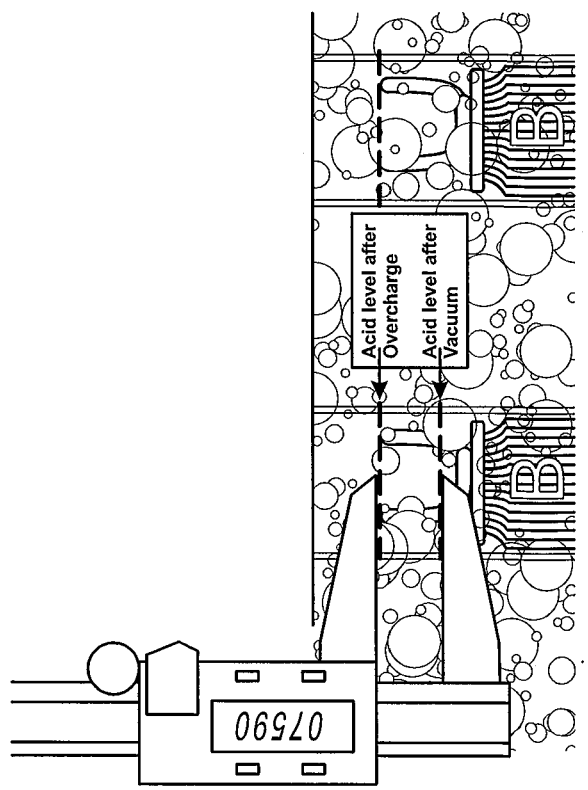
Fig. 9

Improving Functional ER

| Description | Height Change after gas evacuation (mm) | Est. Gas Volume (cc) |
|---|---|---|
| Cell with no separator (glass rods) | 6.9 | 52.3 |
| Cell with standard separator | 15.6 | 118.0 |
| Standard separator (Minus Plate) | | 65.7 |
| Cell with no separator (glass rods) | 6.9 | 52.3 |
| Cell with DuraLife® separator | 11.6 | 87.8 |
| DuraLife® separator (Minus Plate) | | 35.5 |

Gas entrapped on the plates → 52.3

46% Reduction in Entrapped Gas on Separator

Fig. 10

Charge Acceptance / Power Delivery

- Lowering Separator Electrical Resistance
  - ◆ Apply Negative Cross Rib (~ 20% Reduction)
  - ◆ Increasing Separator Porosity (~ 50% Reduction)
- Reduce Functional Separator Electrical Resistance
  - ◆ Minimize Entrapped Gas (~40% Reduction)
- Increasing Available Electrolyte

Fig. 11

Cycle-Ability

Prevent Shedding of Positive Active Material (PAM)

- Increase Number of Ribs -> Increase Contact Points
- Separator Laminate (e.g. glass-mat)
  ◆ Increase Gas Entrapment

Fig. 12

Laminate Gas Entrapment

| Description | Height Change after gas evacuation (mm) | Estimated Gas Volume (cc) | | Estimated Gas Volume (cc) |
|---|---|---|---|---|
| Cell with no separator (glass rods) | 5.55 | 42.0 | Plate | 42.0 |
| Cell with separator | 9.31 | 70.6 | Separator | 28.5 |
| Cell w/ separator and laminate A | 14.06 | 106.6 | Laminate A | 36.0 |
| Cell w/ separator and laminate B | 10.59 | 80.3 | Laminate B | 9.7 |
| Cell w/ separator and laminate C | 9.87 | 74.8 | Laminate C | 4.2 |

Fig. 13

Modified Micro-Hybrid Separator

- Micro-Hybrid -> Best Value Proposition
  - ◆ Enhanced Flooded Battery--> Preferred Value
- Charge Acceptance / Power Delivery
  - ◆ Lower Electrical Resistance -> Negative Cross Rib
  - ◆ Lower Electrical Resistance -> Higher Porosity
  - ◆ Minimize Gas -> DuraLife® Separator
- Cycle-Ability
  - ◆ Increase Number of Ribs -> Active Material Support
  - ◆ Laminate Structure -> Active Material Support
    - • Proper Selection to minimize Gas Entrapment

Fig. 14

Modifications Applied to Existing Markets

- Improved Enveloper Runnability
- Lower Separator Electrical Resistance
- Lower Gas Entrapment

Fig. 15

Challenges / Opportunities

- Utilization of Active Material
- Deleterious Effects of Sulfation
- Minimize Corrosion
- Prevent Shedding

- Historic Evolution
- Separator Modifications

Fig. 16

Historical Development

Wood Shingles        1900 – 1950s
Rubber               1930 – ongoing*
Cellulosic           1950 – 2000
Sintered PVC         1960 – 2010
PE Separator         1980 – ongoing
Modified PE for Deep Cycling    2000 – ongoing

* Used in Niche Applications Today

Fig. 17

Separator Properties

- Sub Micron Pore Size
  Short Prevention

Silica Nodes
Polyethylene Fibrils
PE Separator

Separator Properties

- Sub Micron Pore Size
  Short Prevention

- Low Acid Displacement
  Improved Electrical Capacity

- Oxidation Resistance
  Extended Life

- Sleeve / Pocket Construction
  Side / Bottom Short Prevent

Fig. 19

Antimony Alloys

- Cons
  - Deposits on Negative -> Depolarization -> Hydrolysis of Water   Answer: Daramic HD and DuraLife®

- Pros
  - Strengthens Grid for Deep Cycling
  - Improves Grid to Active Material Interface
  - Retards Grid Corrosion

Fig. 21

Idle Start/Stop (ISS)

- Dual Functionality
  - High Power (SLI)
  - Frequent Cycling

- Increased Power Delivery
  - Lower Internal Resistance (Separator Resistance)
  - Increase Acid => Diffusion Limitations

Fig. 22

Separator Comparison

| Characteristic | Unit | Daramic HP | DuraLife® |
|---|---|---|---|
| Nominal Thickness | (mils) | 10.0 | 10.0 |
| Oxidation Resistance Residual Mechanical Properties | (%) | 25.9 | 51.6 |
| Basis Weight | (gsm) | 186 | 154 |
| Puncture Resistance | (N) | 12.9 | 14.2 |
| Acid Displacement | ($cm^3/m^2$) | 136.4 | 108.9 |
| Residual Oil | (%) | 14.5 | 12.5 |
| Porosity | (%) | 54.8 | 55.2 |
| Electrical Resistance | ($mohm\text{-}in^2$) | 13.0 | 10.2 |

Fig. 24

Cycle-Life Improvement

- Prevents Shedding of PAM
- Oxidative Resistant
- Maximize Acid Availability
- Minimize Entrapped Gas

Separator with Optimized Laminate

JM Caublot and D. Dreyer, German Patent 103 27 080.9 (2003)

Summary

● Lead Batteries +100 years old
● Evolutionary Development
　Wood Shingles
　Rubber
　Cellulosic
　PVC
　PE
　Modified PE for Deep Cycling

Fig. 28

Idle Start – Stop

- High Power to Crank
  - Maximize Acid
  - Minimize Gas Entrapment

- Extend Cycle Life
  - Immobilize Electrolyte Prevent Stratification
  - Laminate to Minimize PAM Shedding

- Broad Application

Fig. 29

Advantages of the Daramic PE Separator

Smallest Pore Size

The maximum pore size of a Daramic PE Separator is less than 1 micron with an average pore size of about 0.1 micron. Separators made from SWP and other types of composite paper and sintered PVC have a much larger pore size which is detrimental to battery life as it is prone to dendrite growth and shorts resulting in battery failure.

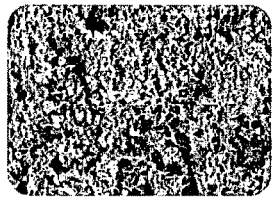 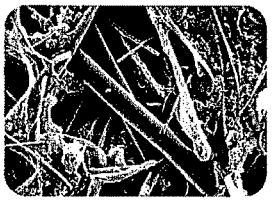 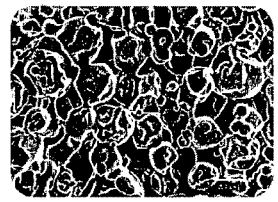

Daramic PE        SWP/ Composite/ Other        Sintered PVC

Note: The magnified pictures demonstrate the relative pore size of various types of separators.

Very Low Electrical Resistance

Daramic PE Separator can be manufactured with a lower web thickness and hence has a significantly lower Electrical Resistance than other conventional separators like PVC, SWP and other composite separators. Lower Electrical Resistance results in enhanced battery performance even at cold cranking conditions.

Low Acid Displacement

Availability of sufficient acid is very essential for the electrochemical reaction. Given the internal dimensions of the battery container, with more acid around the plates, there are less chances of a dry-out that would result in battery failure. Low backweb and high porosity of the Daramic PE Separator displaces less acid resulting in more acid availability around the plates.

Characteristics of Daramic PE Separator

Daramic PE Separators are manufactured to stringent quality specifications that result in high puncture resistance, very small pore size, low electrical resistance, high porosity and a high resistance to oxidation due to the presence of a special mineral oil and anti-oxidants. This is to ensure that the battery does not fail due to puncture.

Fig. 31

Introducing the Daramic PE Leaf Separator

Daramic Auto PE Leaf Separator

Daramic Auto PE Leaf Separator is made out of Daramic-HP grade PE separator laminated with Glassmat and cut to required size to meet the specification of customers. The lamination of a thicker layer of Glassmat on the PE separator base renders sufficient rigidity to the product for easy insertion between the plates, without compromising the basic qualities and advantages of Daramic PE. The Glassmat serves to retain the acid around the plate and is beneficial for battery performance due to its dual function of maintaining positive plate integrity as well as increasing the oxidation resistance the PE separator. The Glassmat holds the plate tightly resulting in reduced plate shedding caused by vibration.

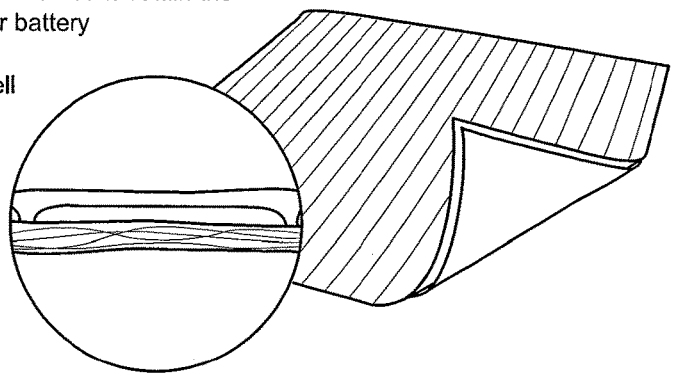

Daramic Industrial PE Leaf Separator

The Daramic Industrial PE Leaf Separator is available in two versions. For the standard high-discharge application, Glassmat is glued to Daramic PE Separator base which has a higher web thickness of around 0.35 mm. The Glassmat (optional) prevents the PE separator base from coming into contact with the positive plate under oxidative conditions, which enhances the cycle life of the PE separator. The higher backweb thickness as compared to an Auto PE separator also gives a longer life to the separator. These separators can be used in Flat Plate Inverter batteries.

For heavy duty applications as in tubular batteries, Daramic recommends the usage of PE separator with a web thickness of 0.45 mm. In addition, the specially designed angular diagonal / sinusoidal front rib on the PE separator significantly reduces the physical contact of the separator back web with the tubular positive plates. The 0.45mm back web thickness will protect the separator from getting oxidized for a longer period in deep cycle applications.

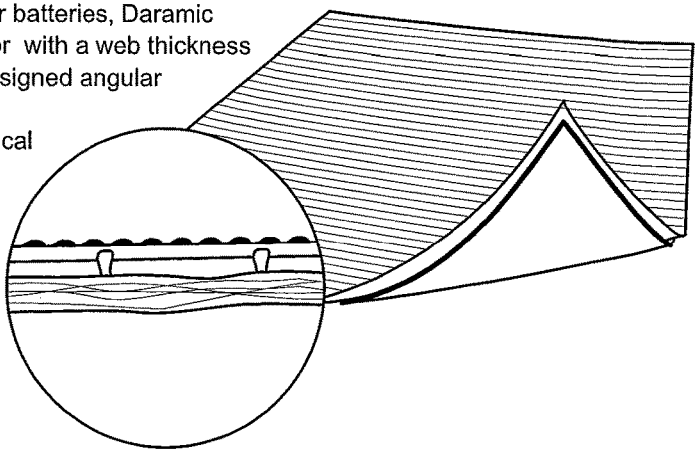

Fig. 32

Separator Comparison

| Characteristics | PE | PVC | Composite Paper | Advantages of PE |
|---|---|---|---|---|
| Average Pore Size (microns) | 0.1 | 15 | 10 | Avoids dendrite shorts |
| Maximum Pore Size (microns) | <1 | 30 | 20 | |
| Electrical Resistance (ohm cm. sq.) | 0.065 | 0.25 | 0.085 | Low electrical resistance enhances cranking performance and also results in higher current output |
| Porosity | 60% | 35% | 74% | |
| Acid Displacement (ml/ sq. m) | 125 | 385 | 130 | Low acid displacement contributes to more active acid in the battery resulting in better performance |
| Oxidation Resistance (hours) | 840 | 300 | 350 | Maximum oxidation resistance in PE Separator with Glass Mat among all separators, contributing to higher life of batteries |
| Puncture Resistance | Good | Very Good | Satisfactory | High puncture resistance in PE Separator protects the separator from the rough edges of the Plate. |

Choice of Usage

Daramic provides you with a choice of procuring the Daramic PE Separator in an Envelope(with or without Glassmat) form, Sleeve form, and in our very new, Leaf form.

Fig. 33

SEPARATORS, BATTERIES, SYSTEMS, AND METHODS FOR IDLE START STOP VEHICLES

CROSS-REFERENCE TO RELATED APPLICATIONS

This application is a divisional application claiming the benefit of and priority from U.S. application Ser. No. 17/463,116, filed on Aug. 31, 2021; which claims priority to U.S. application Ser. No. 16/142,158, filed Sep. 26, 2018, now U.S. Pat. No. 11,104,804 issued on Aug. 31, 2021; which claims priority to U.S. application Ser. No. 13/239,483 filed Sep. 22, 2011, now U.S. Pat. No. 10,119,025, issued on Nov. 6, 2018, and which claims priority to and the benefit of U.S. provisional patent application Ser. No. 61/385,285, filed Sep. 22, 2010, and Ser. No. 61/532,598, filed Sep. 9, 2011, all of which are hereby fully incorporated by reference herein.

FIELD OF THE INVENTION

In accordance with at least selected embodiments, the present invention is directed to new or improved battery separators, batteries, systems, components, compositions, and/or methods of manufacture and/or methods of use. In accordance with at least selected embodiments, examples or aspects, the present invention is directed to new, improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, and/or methods of production, and/or methods of use.

BACKGROUND

In order to reduce fuel consumption and generation of tail pipe emissions, auto manufacturers have implemented varying degrees of electrical hybridization. (See FIG. 1) One form Hybrid Electric Vehicle (HEV) is often referred as the 'Micro HEV'. In such Micro HEV or concepts, the automobile has the idle stop/start (ISS) function and often regenerative braking. In order to keep costs down, many auto manufacturers are considering a flooded lead acid battery to meet the electrical functionality associated with the ISS function. As the functionality associated with this battery is often different than a standard automotive application, such as Starting Lighting and Ignition (SLI) battery, this may result in different functions or preferred performance of the ISS battery separator (and ISS battery).

The ISS flooded lead acid battery will be operated in a partial state of charge (PSoC), approximately 50 to 80% unlike the typical SLI battery which is usually operated at 100% state of charge. With regenerative braking and frequent restarting, the battery will experience shallow charge and recharge cycles. Depending on the design of the electrical system, the ISS battery may not normally go into overcharge and thus may not generate oxygen and hydrogen gas which can be useful for acid mixing.

Although the ISS battery of choice may be an ISS or enhanced flooded lead acid battery, it is understood that the ISS battery may be a gel, polymer or other battery, a capacitor, a super capacitor, an accumulator, a battery/capacitor combination, and/or the like.

The advent of Micro HEV and ISS with or without regenerative breaking sets new demands on the battery and the battery separator. Hence, a need exists for new or improved battery separators, batteries, systems, components, compositions, and/or methods of manufacture and/or methods of use; new, improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, and/or methods of production, and/or methods of use; and/or the like.

A group of inorganic (mineral) compounds are known to effectively bind heavy metals such as lead, cadmium, iron, zinc, and copper. The mechanism by which the minerals bind heavy metals is termed "Phosphate Induced Metal Stabilization" (PIMS) and is widely utilized for the environmental remediation of heavy metals from contaminated soils and water. In environmental remediation applications, bulk quantities of minerals possessing PIMS affinity for toxic metals are mixed with contaminated soil or contained within a housing whereby contaminated water may perfuse through the bulk PIMS mineral cake to reduce heavy metal contamination.

A common failure mode within the lead-acid (or lead-calcium) battery industry is the phenomenon of "hydration shorts". This type of short circuit is typically formed in batteries when they are allowed to stay at very low acid concentrations (low charge) for an extended period of time. In a charged state, the acid density is high (for example, 1.28 $g/cm^3$) and the solubility of lead sulfate is low. At low charge, the acid density decreases and the solubility of lead sulfate increases. At low charge, lead sulfate ($PbSO_4$), from the electrode plates, enters into the electrolyte solution (sulfuric acid $H_2SO_4$). Upon recharging, lead sulfate is precipitated and can form a layer on the bottom of many of the separator pores (the separator pores are large compared to the ionic radii of lead and sulfate). Upon additional recharging of the battery and contact with the negative electrode of the battery, the precipitated lead sulfate can be reduced to lead and thousands of microshorts between the electrodes can be generated (hydration shorts and battery failure).

Typically, this "hydration shorts" phenomenon occurs when a battery encounters a slow discharge as in the case of storage over extended periods without maintenance of charge. The conventional approach to the prevention of hydration shorts consists of addition of sodium sulfate ($Na_2SO_4$) to the electrolyte solution during battery manufacture. This approach requires an additional manufacturing step, the addition of sodium sulfate to the electrolyte, and adds complexity to the battery processing. Sodium sulfate addition acts to "hinder" hydration shorts via the Common Ion Effect but does not address the root cause (soluble lead generation).

As such, there exists a need for new or improved battery separators and the like for particular battery applications, particular uses, and/or for addressing, reducing or eliminating the phenomenon of "hydration shorts" in lead acid batteries.

SUMMARY

In accordance with at least selected embodiments, the present invention addresses, provides or is directed to the above needs for new or improved battery separators, batteries, systems, components, compositions, and/or methods of manufacture and/or methods of use; new, improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, and/or methods of production, and/or methods of use; and/or the like.

Although the preferred battery embodiment of the present invention may be an ISS flooded lead acid battery, it is understood that the present battery may be a gel, polymer or other battery, a capacitor, a super capacitor, an accumulator, a battery/capacitor combination, and/or the like.

Also, although the preferred improved separators of the present invention may find special applicability in ISS batteries, they may also be used in other batteries or devices.

The advent of Micro HEV and ISS with or without regenerative breaking sets new demands on the battery and the battery separator. (See FIG. 2) Such new demands may be addressed or met by at least certain embodiments of the batteries or separators of the present invention.

The ISS flooded lead acid battery will be operated in a partial state of charge (PSoC), approximately 50 to 80% unlike the typical SLI battery which is usually operated at 100% state of charge. With regenerative braking and frequent restarting, the battery will experience shallow charge and recharge cycles. Depending on the design of the electrical system, the ISS battery may not normally go into overcharge and thus may not generate oxygen and hydrogen gas which can be useful for acid mixing.

In accordance with at least selected embodiments, examples or aspects of the present invention, the new demands described above, may preferably lead to the following specific possibly preferred changes to the separator, battery and/or electrical system:

1) Charge Acceptance/Power Delivery—The lead-acid battery is an excellent storage medium for energy, but one of the limitations is the ability to accept charge rapidly, particularly when the battery is at a high state of charge. In ISS applications, this rapid charge may come from the use of regenerative braking, which will recover much of the energy used in slowing the vehicle. For this reason, the battery will typically be operated at a lower state of charge. The battery separator must also contribute to the ability of the battery to accept charge rapidly. Below are some specific preferred changes to the separator to help increase charge acceptance/power delivery.
   a. Low Electrical Resistance (ER)—In order to maximize charge acceptance during regenerative braking and power delivery during restart of the internal combustion engine, it may be important to minimize the separator ER. The separator ER can be lowered via the following methods:
      i. Lower Back-Web (BW) Thickness—As the BW thickness is the main contributor to separator ER, this can be reduced from typical values which range from 150 to 250 micron. However as this is done, the material may become very challenging to process on typical envelopers. Here it is recommended to lower the BW thickness between 75 to 150 microns and then reinforce the transversal stiffness with the use of negative cross ribs. (See FIGS. 5 and 6)
      ii. Increase silica to polymer ratio—A second method to reduce ER in the separator is to increase the loading of silica, relative to the polymer content. One possibly significant issue with this change is that the oxidation resistance of the separator may be compromised to some degree. In a standard SLI battery, the battery is subjected to heavy overcharging, wherein oxidizing species are generated in the positive plate. However, in ISS applications, the battery will not be generating oxidizing species as overcharge situations will be limited by design of the electrical system, therefore the separator will not be required to have as much oxidation resistance as is required in a typical SLI application. The silica to polymer ratio could vary from about 3.0/1.0 to 5.0/1.0.
      iii. Utilize High Oil Absorption silica—A third approach to reduce the ER is to utilize a silica with a high surface area (e.g. >200 $m^2$/g), which typically yields a high oil absorption. With this type of silica, the amount of pore forming agent can be increased from 60 to 65% by weight to 70 to 80% in the extrusion process and thus yields a significantly higher final porosity and lower electrical resistance. (See FIG. 11)
   b. Minimize Gas Entrapment—It has been recognized that hydrogen and oxygen gas generated by the battery active materials during charge and discharge may become trapped by the separator, insulating a portion of the plate and rendering it unable to partake in charge and discharge reactions. This may ultimately limit the ability of the battery to accept charge and deliver power. Following are some specific changes to reduce the opportunity for gas entrapment:
      i. Laminate Structure—In a number of the designs that have been proposed for ISS batteries, a laminate structure has been incorporated into the separator in order to help retain the positive active material (PAM) in the positive plate. In general, these laminates tend to increase the amount of gas entrapped in the cell. (See FIGS. 12 and 13) By modifying the laminate structure, it is anticipated that gas entrapment could be reduced significantly. Potential preferred modifications could be:
         1. Treatment of the laminate with a chemical or plasma to modify surface energy to shed gas bubbles
         2. Perforation to allow bubbles an area to coagulate and escape the laminate matrix
         3. Addition of nucleating agents
         4. Changing the structure of the laminate during formation
         5. Addition of polymer fibers to the laminate structure
         6. Addition of wetting agents
         7. Change the orientation on the fiber structure of the laminate so gas bubbles are less likely to attach to the structure.
         8. Minimize the thickness of the structure so that there are simply less sites for bubble adhesion.
      ii. Wetting Agent Selection—It has been demonstrated that the selection of a wetting agent for use on the polyethylene separator can have a significant influence on the retention of gas bubbles in the cell. It is understood that wetting agents with more hydrophobic behavior may exhibit better performance in this aspect than those that tend to be hydrophilic. For example, ethoxylated fatty alcohols are generally preferred over substituted sulfosuccinates.

iii. Cross-Ribs (Negative and/or Positive)—In testing performed to examine gassing behavior, it has been noted that small negative cross ribs appear to assist in the nucleation and/or transport of gas bubbles to the outside of the cell, allowing the gas to escape from between the plates, reducing the potential for gas entrapment.

iv. Nucleation of Gas—A wide variety of modifications may be made to the separator in order to assist in the providing areas on the separator to act as nucleation sites for gas bubbles to quickly and efficiently grow to the point where they are released from the separator and travel out of the area between the plates.

1. Shape—By incorporating certain nanostructures onto the surface of the polyethylene separator, gas nucleation may be increased significantly. These nanostructures may take the form of pyramids, chevrons, or pillars, as examples. They may be formed by calendaring, laser ablation or controlled chemical oxidation.

2. Additives—Additives may be incorporated into the matrix of the separator in order to provide areas on the surface where they change the surface structure or energy. These changes will encourage the nucleation of small gas bubbles generated to a critical volume. Examples of these additives are carbon fibers, carbon nanotubes, or barium sulfate.

2) Hydration Shorts—This type of short circuit is formed in batteries when they are allowed to stay at very low acid concentrations for an extended period of time. This phenomenon is well known in the battery industry, as is the use of sodium sulfate in the electrolyte as a potential remedy for this phenomenon. In an ISS application, where the battery seldom receives a full charge, the danger of forming hydration shorts is believed to be significantly greater than in a typical SLI battery. The following are some of the significant separator changes that may help reduce the occurrence of hydration shorts:

a. Common Ion Effect—It is well known that the addition of sodium sulfate to the battery electrolyte will inhibit the formation of hydration shorts, via the Common Ion Effect. In the present variant, sodium sulfate is incorporated into the separator matrix (and/or laminate), allowing the sodium sulfate to be in the proper location to most efficiently reduce the chance of formation of hydration shorts.

b. Heavy Metal Sequestration—By irreversibly adsorbing and sequestering lead ions that are in solution, certain additives could be incorporated into the separator to inhibit hydration short formation. Examples of materials that may be used for this include apatite, zeolites, lignins and rubber-derivatives.

c. Location of Additives—It should be noted that the additives associated with the Common Ion Effect or the Sequestration of heavy metals can be added directly to the matrix of the separator, coated or contained on laminate structure or coated onto the container of the battery case either before or after the injection molding process, and/or the like.

d. Lower Acid Displacement—If the separator were capable of displacing less acid, then the total amount of sulfate ions in the acid solution would be higher, resulting in a retardation of the hydration effect. In other words, this would be an additional buffer against the over-discharge of the battery. In order to accomplish this, potential preferred separator modifications may include lower backweb thickness (as discussed previously), higher porosity, or less rib mass of the separator.

i. Serrated/Battlement Ribs—A serrated or battlement rib design may be used to remove mass from the ribs. This concept is detailed in U.S. Pat. No. 7,094,498 hereby incorporated by reference. By modifying the rib design in this way, the separator will have less acid displacement.

3) Improve Cycle Life—In order to meet the expectations of both the battery and vehicle manufacturers, the cycle life of a typical lead acid battery should be improved, particularly when the battery is subjected to high temperatures and a heavy cycling duty. One school of thought is to reduce the state of charge of the battery to reduce the amount of overcharge and subsequent corrosion of the positive plate. However, by following this route, the chance of having hydration shorts increases dramatically. By modifying the separator, these potential issues may be eliminated. A few of the potential preferred modifications are detailed below.

a. Laminate—In many deep cycle lead-acid batteries, laminates are utilized to retain the positive active mass in the positive grid. This structure eventually incorporated into the positive plate due to the natural expansion of the positive active mass during cycling operation. This allows the positive active mass to maintain intimate contact, and therefore capacity for a significantly longer period of time than otherwise possible. It is anticipated that separators for flooded ISS applications will incorporate a laminate, as the anticipated duty cycle and environment will be harsh.

i. Glass Mat—In many flooded lead-acid batteries, glass mats are utilized in order to help retain intimate contact between the positive active material and the positive grid. One potential variant envisioned for ISS will continue to utilize glass mats, albeit with the potential to mix different fiber lengths and widths in the mats ranging in compressed thickness from 0.1 mm to 1.0 mm.

ii. Synthetic Nonwovens—Nonwoven polymeric mats have also been utilized recently as active material retainers in lead-acid batteries. These materials are typically made of polyester. (refer to Polymat published patent application, US 2006/0141350 A1, hereby incorporated by reference herein)

iii. Hybrid—It is imagined that hybrids of glass mixed with polymers may be incorporated into a hybrid mat, which will have the rigidity and oxidation resistance inherent in the glass with the tear resistance and toughness of nonwovens. By combining the properties of both materials, a mat with superior properties for the battery may be produced.

b. Profile Selection—The selection of a profile or ribbing design is not often considered for adding benefits to a typical flooded lead-acid battery. For ISS applications, however, it is believed that the profile design may have a much greater impact on the battery performance. The goal of having lower acid displacement may be contributed to by the profile design. (See FIG. 26) Conversely, it is established within the industry that tighter rib spacing is beneficial for deep cycle applications. A unique compromise between the two may be required.

4) Acid Stratification—In a variety of flooded lead-acid batteries, the stratification of acid in the electrolyte has been an issue in applications with heavy cycling requirements and few complete recharges. When a battery cycles repeatedly, but is not fully charged, or overcharged, the acid in the battery can separate, to the point where there will be water at the top of the battery, and concentrated sulfuric acid at the bottom. Typically, battery manufacturers will specify that a battery should be overcharged to some degree, promoting the electrolysis of water. The hydrogen and oxygen produced during this overcharging will agitate the electrolyte, mixing the water and acid. As mentioned earlier, in ISS applications, batteries will be maintained in PSoC conditions with few opportunities for overcharging to mix the acid. Therefore, any potential benefits to either acid mixing or retardation of acid stratification from the separator will be critical.
  a. Profile Selection—As mentioned earlier, profile selection will be a critical attribute for a number of properties. Another benefit may come from the incorporation of horizontal ribs across the surface of the separator in acting as a physical barrier to acid stratification. It is imagined that these cross-ribs could take a wide range of forms (reference the above mentioned negative cross-rib patent application and positive cross-rib patent).
  b. Laminate Structure—The laminate structure attached to the polyethylene separator may also serve to discourage acid stratification. By aligning the fibers in a certain pattern across and through the material, it is envisioned that the glass mat may help to keep the acid from become stratified.
  c. Surface Area—Minimizing the acid stratification may also be accomplished by increasing the surface area of the separator structure. This can be accomplished by first decreasing the fiber diameter of the laminate structure or second by increasing the internal surface of the separator by the type or concentration of silica.

5) VRLA—It is also recognized that valve-regulated lead acid (VRLA) batteries may have a role in the market for automotive ISS applications. In this type of construction, the electrolyte is absorbed and held in the matrix of the separator. Predominant technologies for this are using an absorptive glass mat (AGM) separator, or gelling the electrolyte, typically with silica as the binding agent. A few novel approaches to VRLA technology are reviewed below in some detail.
  a. Acid Jellifying Separator—The acid jellifying separator (AJS) is a concept that has been utilized in the past. By modifying the separator to incorporate high surface area silica with a high loading of such silica in the polyethylene separator, a new or improved product has been produced that allows the separator to absorb enough acid to make it a viable separator for a VRLA design. This Daramic AJS product may allow a manufacturer to utilize standard flooded battery construction equipment and techniques to produce a VRLA product. The AJS separator will have superior behavior in improving cycling, as it is in intimate contact with the positive plate, preventing shedding of the active material. It will also prevent acid stratification issues, as the polymer matrix along with the silica will inhibit the flow and separation of the electrolyte.
  b. Polyethylene/Absorptive Glass Mat Hybrid—One of the key limiting factors in reducing plate spacing in batteries with AGM separators is the ability of AGM to hold up against plate defects and prevent short circuits from occurring. Typically, these short circuits do not show up until after the battery has gone through the complete assembly and charging process, adding to the high cost of this type of product. By incorporating a flat PE separator membrane into or on one side of the AGM separator, the plate spacing in the battery may be reduced without increasing failures in early life. The PE separator will act as a shield, reducing the possibility that minor plate defects will cause a short circuit.
  c. Other Laminate Hybrids—It is imagined that other laminate systems, whether nonwovens or other glass mats could be utilized in conjunction with a flat PE separator membrane to make an acceptable VRLA separator.

The inventive lead-acid storage battery may be required not only to supply power as a main power supply for electric cars, but also to provide a new function as a power supply for starting and recovering regenerative current for hybrid electric cars, simplified hybrid cars and ISS-compatible cars having an idle stop and start (ISS) function.

The complete description and drawings of separators with negative cross ribs of various configurations and methods of U.S. patent application Ser. No. 61/253,096, filed on Oct. 20, 2009, entitled "LEAD ACID BATTERY SEPARATORS WITH CROSS RIBS AND RELATED METHODS" and of pending U.S. patent application Ser. No. 12/904,371, filed on Oct. 14, 2010, entitled "BATTERY SEPARATORS WITH CROSS RIBS AND RELATED METHODS" are each hereby fully incorporated by reference herein.

In accordance with at least selected embodiments, the present invention addresses the need for new or improved battery separators and the like for particular battery applications, particular uses, and/or for addressing, reducing or eliminating the phenomenon of "hydration shorts" in lead acid batteries.

In accordance with at least selected embodiments, the present invention addresses, provides or is directed to new or improved batteries, separators, components, and/or compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof and utilizing at least one PIMS mineral as at least one filler component therein; a silica filled lead acid battery separator wherein a PIMS mineral (preferably ground fish meal, a bio-mineral)

is provided as at least a partial substitution for the silica filler component in the silica filled lead acid battery separator (preferably a polyethylene/silica separator formulation); and/or the like.

In accordance with at least selected embodiments, the present invention addresses, provides or is directed to new or improved batteries, separators, components (such as battery casings, battery parts, porous bags, laminates, coatings, surfaces, fillers, electrochemically active electrode formulations, electrolytes, and/or the like), and/or compositions having heavy metal removal capabilities utilizing at least one source of natural or synthetic hydroxyapatite having heavy metal binding capabilities, such as a PIMS mineral, and/or methods of manufacture and/or methods of use thereof.

In accordance with at least selected possibly preferred embodiments of the present invention, a believed novel concept of utilizing PIMS minerals as a filler component within a microporous lead-acid battery separator is provided. In accordance with one particular possibly more preferred embodiment or example, the PIMS mineral (preferably fish meal, a bio-mineral) is provided as at least a partial substitution for the silica filler component in contemporary silica filled lead acid battery separator (preferably a polyolefin/silica or polyethylene/silica/oil separator formulation).

In accordance with selected embodiments or aspects of the present invention, a variety of "Phosphate Induced Metal Stabilization" (PIMS) minerals have been identified; some of which have been evaluated for lead affinity. A PIMS mineral derived from fish bone (such as commercial, lab ground fish meal) has been shown to have greatest affinity for lead ion over the other samples evaluated. The fish bone powder was extruded via pilot operation into a typical lead-acid battery separator format at several loading concentrations. The resulting PIMS incorporating separator was evaluated for lead removal efficiency; the separator demonstrated substantial reduction of lead concentration in acidic solution. For example, % Pb reductions of about 17% to 100% were demonstrated. In accordance with at least certain embodiments, it is preferred that the fish bone powder be added to substitute for a portion of the silica filler at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica filler at substitution levels of about 1% to 50% or more of the silica, more preferably about 5% to 30%, and most preferably at about 10% to 20%.

It is believed that this is the first commercial use of a bio-mineral in a battery separator, in an extruded polyolefin polymer resin, and in a porous polymer film or membrane.

In accordance with at least selected embodiments, lead reduction is achieved by incorporating PIMS minerals in lead-acid battery separators, preferably incorporating PIMS mineral derived from fish bone.

The present invention represents a novel or improved microporous membrane substrate with chemically active properties. A range of various chemically active or reactive mineral fillers are available and amenable to the separator extrusion and extraction process. These minerals are available at low cost in desired purity and in the case of fish bone are industrial by-products available from multiple sources. Advantages include low cost of raw material as well as streamlining existing battery production processes involving sodium sulfate.

The preferred separators of the present invention are microporous materials (e.g. pores less than 1 micron). Nonetheless, other materials such as porous or macroporous materials are contemplated. For example, macroporous separators (e.g. pores greater than 1 micron) would include separators made from rubber, PVC, synthetic wood pulp (SWP), glass fibers, cellulosic fibers, polypropylene, and combinations thereof.

In accordance with at least selected embodiments, the present invention is directed to other components and/or compositions having heavy metal removal capabilities and/or methods of manufacture and/or methods of use thereof. In accordance with at least certain possibly preferred embodiments, the present invention is directed to new or improved lead acid battery components (such as battery casings, battery parts, porous bags, laminates, coatings, surfaces, fillers, electrodes, electrolytes, and/or the like) and/or polymer or resin compositions having heavy metal removal capabilities and/or methods of manufacture and/or methods of use thereof. In accordance with at least possibly more preferred particular embodiments, the present invention is directed to such new or improved lead acid battery components (such as battery casings, battery parts, porous bags, laminates, coatings, surfaces, fillers, electrodes, electrode formulations, electrolytes, and/or the like) and/or polymer or resin compositions utilizing at least one PIMS mineral as at least one filler component therein. In accordance with at least one particular embodiment, the PIMS mineral (preferably ground fish meal, a bio-mineral) is provided as at least a partial substitution for the silica filler component in a silica filled polymer composition, such as a polyolefin/silica composition, for example, in a polyethylene/silica/oil formulation suitable for slot die extrusion.

In accordance with at least certain other embodiments or examples, the invention is directed to new or improved batteries, separators, components, and/or compositions having lead removal, binding, bonding, absorbing, retaining, and/or scavenging capabilities and/or methods of manufacture and/or methods of use thereof.

In accordance with at least selected objects of the present invention, there is provided new or improved batteries, separators, components, and/or compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrodes, electrolytes, and/or the like) and/or polymer or resin compositions having heavy metal removal capabilities and/or methods of manufacture and/or methods of use thereof; new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and utilizing at least one source of natural and/or synthetic hydroxyapatite having heavy metal binding capabilities, preferably having at least one PIMS mineral as at least one filler component therein; particular microporous lead-acid battery separator embodiments wherein the PIMS mineral (preferably fish meal, a bio-mineral) is provided as at least a partial substitution for the silica filler component in a silica filled lead acid battery separator (preferably a polyethylene/silica separator formulation); battery separators, to methods of manufacture of battery separators, to methods of use of battery separators, to improved battery separators, and/or to improved separators or laminates for lead acid batteries; and/or the like.

BRIEF DESCRIPTION OF THE DRAWINGS

Drawing sheets 1 to 33 are respective slides, illustrations, text, charts, and/or images and are fully made part of this application and relied upon for all they show and disclose. For example, FIGS. 5, 26, 27, and 32 illustrate possibly preferred separator embodiments.

DETAILED DESCRIPTION OF THE INVENTION

Figure 1:
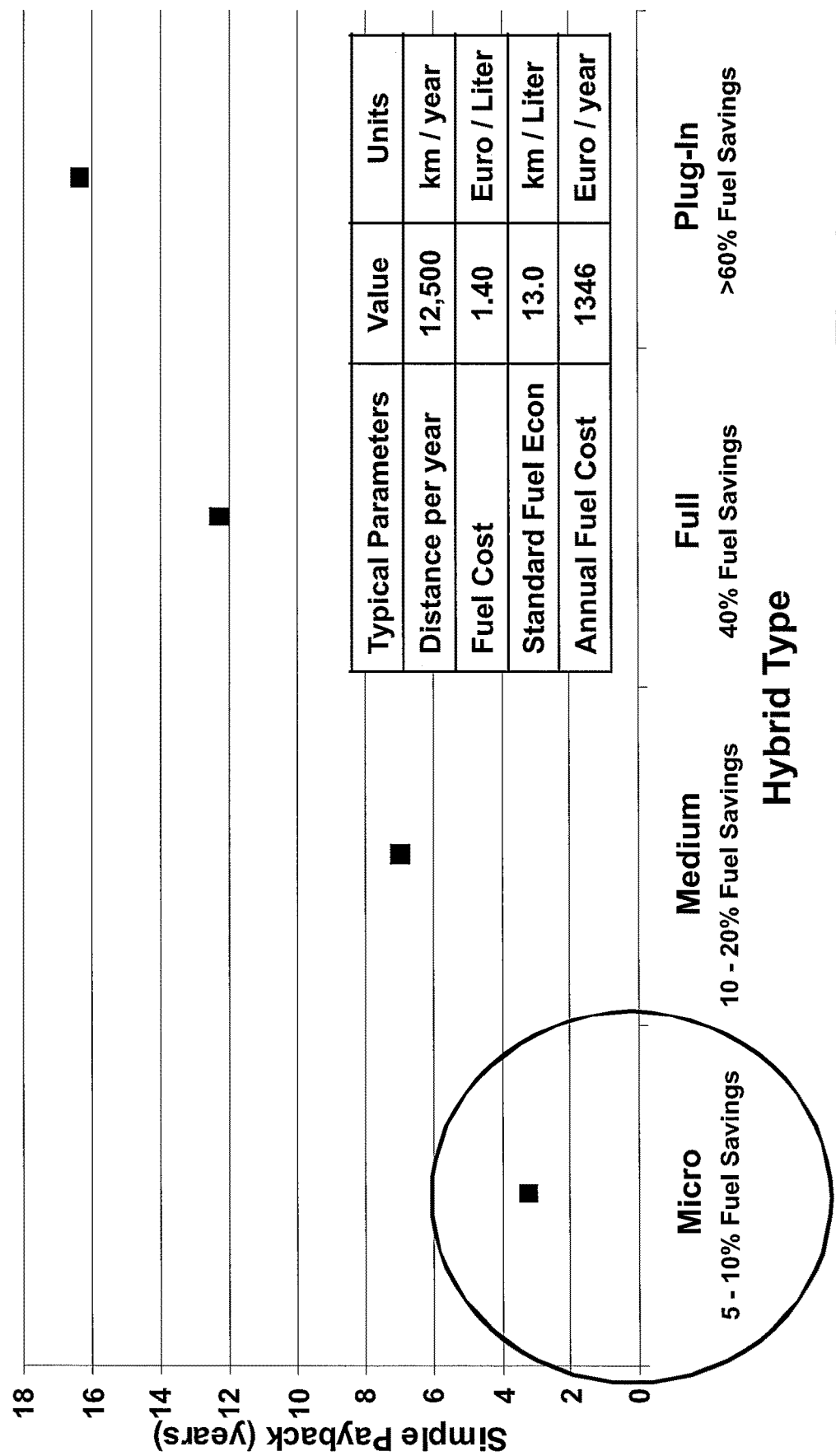
Figure 4:
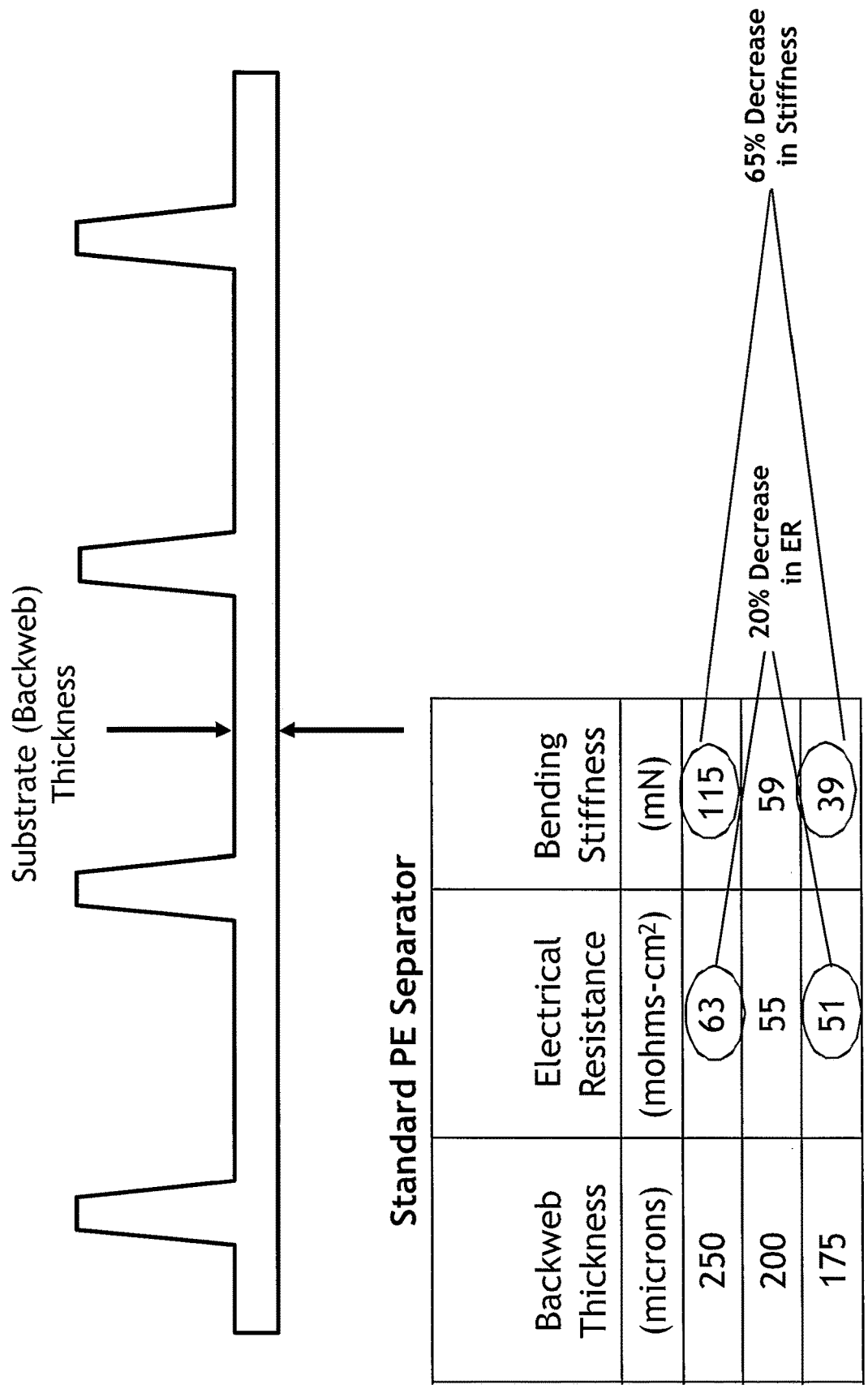

In accordance with at least selected embodiments, examples, or objects of the present invention, there are provided new or improved battery separators, batteries, systems, components, compositions, and/or methods of manufacture and/or methods of use; new, improved, unique, and/or complex performance battery separators, lead acid battery separators, flooded lead acid battery separators, enhanced flooded lead acid battery separators, ISS or microhybrid battery separators, ISS flooded lead acid battery separators, ISS enhanced flooded lead acid battery separators, batteries including such separators, systems or vehicles including such batteries or separators, and/or methods of production, and/or methods of use; and/or the like.

In accordance with at least selected embodiments, examples, aspects, or objects of the present invention, the preferred separator, battery and/or electrical system preferably includes one or more, more preferably includes two or more, and possibly most preferably includes three or more of the following possibly preferred improvements, features, changes, modifications, enhancements, performance, characteristics, profiles, shapes, configurations, structures, parts, attributes, spacing, thicknesses, ratios, blends, mixtures, formulations, additives, agents, coatings, layers, laminates, mats, non-wovens, surfaces, inclusions, effects, embodiments, examples, combinations, sub combinations, and/or the like:

1) Charge Acceptance/Power Delivery—preferred features or changes to the separator to help increase charge acceptance/power delivery:
   a. Low or Lower Electrical Resistance (ER)—In order to maximize charge acceptance during regenerative braking and power delivery during restart of the internal combustion engine, it may be important to minimize the separator ER. The separator ER can be lowered via the following methods:
      i. Lower Back-Web (BW) Thickness—As the BW thickness is the main contributor to separator ER, this can be reduced from typical values which range from 150 to 250 micron. However as this is done, the material may become very challenging to process on typical envelopers. Here it is recommended to lower the BW thickness between 75 to 150 microns and then reinforce the transversal stiffness with the use of negative cross ribs. (See FIGS. 5 and 6)
      ii. Increase Silica to Polymer Ratio—A second method to reduce ER in the separator is to increase the loading of silica, relative to the polymer content. One possibly significant issue with this change is that the oxidation resistance of the separator may be compromised to some degree. In a standard SLI battery, the battery is subjected to heavy overcharging, wherein oxidizing species are generated in the positive plate. However, in ISS applications, the battery will not be generating oxidizing species as overcharge situations will be limited by design of the electrical system, therefore the separator will not be required to have as much oxidation resistance as is required in a typical SLI application. The silica to polymer ratio could vary from about 3.0/1.0 to 5.0/1.0.
      iii. Utilize High Oil Absorption (High Surface Area) Silica (Increase Porosity)—A third approach to reduce the separator ER is to utilize a silica with a high surface area (e.g. >200 $m^2/g$), which typically yields a high oil absorption. With this type of silica, the amount of pore forming agent can be increased from 60 to 65% by weight to 70 to 80% in the extrusion process and thus yields a significantly higher final porosity and lower electrical resistance. (See FIG. 11)
   b. Minimize Gas Entrapment—It has been recognized that hydrogen and oxygen gas generated by the battery active materials during charge and discharge may become trapped by the separator, insulating a portion of the plate and rendering it unable to partake in charge and discharge reactions. This may ultimately limit the ability of the battery to accept charge and deliver power. Following are some specific changes to reduce the opportunity for gas entrapment:
      i. Laminate Structure and Modifications—In a number of the designs that have been proposed for ISS batteries, a laminate structure has been incorporated into the separator in order to help retain the positive active material (PAM) in the positive plate. In general, these laminates tend to increase the amount of gas entrapped in the cell. (See FIGS. 12 and 13) By modifying the laminate structure, it is anticipated that gas entrapment could be reduced significantly. Potential preferred modifications could be:
         1. Treatment of the laminate with a chemical or plasma to modify surface energy to shed gas bubbles.
         2. Perforation to allow bubbles an area to coagulate and escape the laminate matrix.
         3. Addition of nucleating agents.
         4. Changing the structure of the laminate during formation.
         5. Addition of polymer fibers and/or shaped polymer fibers to the laminate structure.
         6. Addition of wetting agents (surfactants).
         7. Change the orientation on the fiber structure of the laminate so gas bubbles are less likely to attach to the structure.
         8. Minimize the thickness of the structure so that there are simply less sites for bubble adhesion.
      ii. Wetting Agent Selection—It has been demonstrated that the selection of a wetting agent for use on the polyethylene separator can have a significant influence on the retention of gas bubbles in the cell. It is understood that wetting agents with more hydrophobic behavior may exhibit better performance in this aspect than those that tend to be hydrophilic. For example, ethoxylated fatty alcohols are generally preferred over substituted sulfosuccinates.
      iii. Separator Cross-Ribs (Negative and/or Positive)—In testing performed to examine gassing behavior, it has been noted that small negative cross ribs appear to assist in the nucleation and/or transport of gas bubbles to the outside of the cell, allowing the gas to escape from between the plates, reducing the potential for gas entrapment.

iv. Nucleation of Gas—A wide variety of modifications may be made to the separator in order to assist in providing areas on the separator to act as nucleation sites for gas bubbles to quickly and efficiently grow to the point where they are released from the separator and travel out of the area between the plates.

1. Profile Shape (Roughness)—By incorporating certain nanostructures onto the surface of the polyethylene separator, gas nucleation may be increased significantly. These nanostructures may take the form of pyramids, chevrons, or pillars, as examples. They may be formed by calendaring, laser ablation or controlled chemical oxidation.

2. Additives—Additives may be incorporated into the matrix of the separator (or on the surface) in order to provide areas on the surface where they change the surface structure or energy. These changes will encourage the nucleation of small gas bubbles generated to a critical volume. Examples of these additives are carbon fibers, carbon nanotubes, or barium sulfate.

2) Hydration Shorts (Hinder, Delay, Reduce, Eliminate)—This type of short circuit is formed in batteries when they are allowed to stay at very low acid concentrations for an extended period of time. This phenomenon is well known in the battery industry, as is adding sodium sulfate to the electrolyte to hinder hydration shorts. In an ISS application, where the battery seldom receives a full charge, the danger of forming hydration shorts is believed to be significantly greater than in a typical SLI battery. The following are some of the significant novel separator changes that may help reduce the occurrence of hydration shorts:

a. Common Ion Effect—It is well known that the addition of sodium sulfate to the battery electrolyte will inhibit the formation of hydration shorts, via the Common Ion Effect. In the present variants, sodium sulfate is incorporated into the separator matrix and/or the laminate materials (such as by impregnation), allowing the sodium sulfate to be in the proper location to most efficiently reduce the chance of formation of hydration shorts.

b. Heavy Metal Sequestration—By irreversibly adsorbing and sequestering lead ions that are in solution, certain additives could be incorporated into the separator (or on the separator surface, in the laminate material, in the electrolyte, in the battery casing, and/or the like) to inhibit hydration short formation. Examples of materials that may be used for this include apatite, hydroxyapatite minerals, ground fish meal, zeolites, lignins, latex, and rubber-derivatives.

c. Location of Additives—It should be noted that the additives associated with the Common Ion Effect or the Sequestration of Heavy Metals can be added directly to the matrix of the separator (preferably as a substitution filler for part of the silica), coated on the separator, coated on or contained in the laminate structure, coated onto the container of the battery case either before or after the injection molding process, placed in porous bags or sachets in the electrolyte or laminate structure, and/or the like.

d. Lower or Reduced Acid Displacement—If the separator were capable of displacing less acid, then the total amount of sulfate ions in the acid solution would be higher, resulting in a retardation of the hydration effect. In other words, this would be an additional buffer against the over-discharge of the battery. In order to accomplish this, potential preferred separator modifications may include:

i. Thin Backweb—Lower backweb (BW) thickness with added cross ribs (preferably negative cross ribs as discussed above), higher porosity, and/or less rib mass of the separator.

ii. Serrated/Battlement Ribs—A serrated or battlement rib design may be used to remove mass from the ribs. This concept is detailed in U.S. Pat. No. 7,094,498 hereby incorporated by reference. By modifying the rib design in this way, the separator will have less acid displacement.

3) Improve Cycle Life—In order to meet the expectations of both the battery and vehicle manufacturers, the cycle life of a typical lead acid battery should be improved, particularly when the battery is subjected to high temperatures and a heavy cycling duty. One school of thought is to reduce the state of charge of the battery to reduce the amount of overcharge and subsequent corrosion of the positive plate. However, by following this route, the chance of having hydration shorts increases dramatically. By modifying the separator, these potential issues may be eliminated. A few of the potential preferred modifications are detailed below.

a. Laminate Structure—In many deep cycle lead-acid batteries, laminates are utilized to retain the positive active mass in the positive grid. This structure eventually incorporated into the positive plate due to the natural expansion of the positive active mass during cycling operation. This allows the positive active mass to maintain intimate contact, and therefore capacity for a significantly longer period of time than otherwise possible. It is anticipated that separators for flooded ISS applications will incorporate a laminate, as the anticipated duty cycle and environment will be harsh.

i. Glass Mat—In many flooded lead-acid batteries, glass mats are utilized in order to help retain intimate contact between the positive active material and the positive grid. One potential present preferred variant envisioned for ISS will continue to utilize glass mats, albeit with the potential to mix different fiber lengths and widths in the mats ranging in compressed thickness from 0.1 mm to 1.0 mm. Preferably a new or improved separator for flooded ISS applications will incorporate this laminate.

ii. Synthetic Nonwovens—Nonwoven polymeric mats have also been utilized recently as active material retainers in lead-acid batteries. These materials are typically made of polyester. (refer to Polymat published patent application, US 2006/0141350 A1, hereby incorporated by reference herein) Preferably a new or improved separator for flooded ISS applications will incorporate this laminate.

iii. Hybrid—It is imagined that hybrids of glass mixed with polymers may be incorporated into a hybrid mat, which will have the rigidity and oxidation resistance inherent in the glass with the tear resistance and toughness of nonwovens. By combining the properties of both materials, a mat with superior properties for the battery may be produced. Preferably a new or improved separator for flooded ISS applications will incorporate this laminate.

b. Profile Selection—The selection of a profile or ribbing design is not often considered for adding benefits to a typical flooded lead-acid battery. For ISS applications, however, it is believed that the profile design may have a much greater impact on the battery performance. The goal of having lower acid displacement may be contributed to by the profile design. Conversely, it is established within the industry that tighter rib spacing is beneficial for deep cycle applications. A unique compromise between the two may be required. For example, a new or improved profile having tight rib spacing with shorter rib height, narrower ribs, battlement ribs, or the like.

c. Polyaspartic Acid—Polyaspartic acid retards crystal formation. In accordance with the present invention, polyaspartic acid can be added directly to the matrix of the separator (this monolithic approach is preferred), coated on the separator, coated on or contained in the laminate structure, coated onto the container of the battery case either before or after the injection molding process, placed in porous bags or sachets in the electrolyte or laminate structure, and/or the like.

d. Compression—A compressible, flexible and/or resilient rib structure may enhance cycle life. For example, an I-beam rib profile may provide the desired compression.

4) Acid Stratification—In a variety of flooded lead-acid batteries, the stratification of acid in the electrolyte has been an issue in applications with heavy cycling requirements and few complete recharges. When a battery cycles repeatedly, but is not fully charged, or overcharged, the acid in the battery can separate, to the point where there will be water at the top of the battery, and concentrated sulfuric acid at the bottom. Typically, battery manufacturers will specify that a battery should be overcharged to some degree, promoting the electrolysis of water. The hydrogen and oxygen produced during this overcharging will agitate the electrolyte, mixing the water and acid. As mentioned earlier, in ISS applications, batteries will be maintained in PSoC conditions with few opportunities for overcharging to mix the acid. Therefore, any potential benefits to either acid mixing or retardation of acid stratification from the separator may be critical.

a. Profile Selection—As mentioned earlier, profile selection may be a critical attribute for a number of properties. Another benefit may come from the incorporation of horizontal ribs across the surface of the separator in acting as a physical barrier to acid stratification. It is imagined that these cross-ribs could take a wide range of forms (reference the above mentioned negative cross-rib patent application and positive cross-rib patent).

b. Laminate Structure—The laminate structure attached to the polyethylene separator may also serve to discourage acid stratification. By aligning the fibers in a certain pattern across and through the material, it is envisioned that the glass mat may help to keep the acid from become stratified. Also, adding the laminate structure to both the positive and negative face of the polyethylene separator may also serve to reduce acid stratification.

c. Surface Area—Minimizing the acid stratification may also be accomplished by increasing the surface area of the separator structure. This can be accomplished by first decreasing the fiber diameter of the laminate structure or second by increasing the internal surface of the separator by the type or concentration of silica, adding porosity, having cross ribs, and/or the like.

d. Acid Immobilization—Minimizing the acid stratification may also be accomplished by immobilizing the acid. This can be accomplished by, for example, having cross ribs which tend to hold the acid in place (see FIG. 26), adding a silica layer on the laminate and/or separator surface or adding silica in the laminate to "gel" the acid and immobilize it, utilizing Daramic AJS technology, or the like.

5) VRLA—It is also recognized that valve-regulated lead acid (VRLA) batteries may have a role in the market for automotive ISS applications. In this type of construction, the electrolyte is absorbed and held in the matrix of the separator. Predominant technologies for this are using an absorptive glass mat (AGM) separator, or gelling the electrolyte, typically with silica as the binding agent. A few novel approaches to VRLA technology are reviewed below in some detail.

a. Acid Jellifying Separator—The acid jellifying separator (AJS) is a concept that has been utilized in the past. By modifying the separator to incorporate high surface area silica with a high loading of such silica in the polyethylene separator, a new or improved product has been produced that allows the separator to absorb enough acid to make it a viable separator for a VRLA design. This new Daramic AJS separator may allow a manufacturer to utilize standard flooded battery construction equipment and techniques to produce a VRLA product. The Daramic AJS separator will have superior behavior in improving cycling, as it is in intimate contact with the positive plate, preventing shedding of the active material. It will also prevent acid stratification issues, as the polymer matrix along with the silica will inhibit the flow and separation of the electrolyte.

b. Polyethylene/Absorptive Glass Mat Hybrid—One of the key limiting factors in reducing plate spacing in batteries with AGM separators is the ability of AGM to hold up against plate defects and prevent short circuits from occurring. Typically, these short circuits do not show up until after the battery has gone through the complete assembly and charging process, adding to the high cost of this type of product. By incorporating a flat PE separator membrane into or on one side of the AGM separator, the plate spacing in the battery may be reduced without increasing failures in early life. The PE separator will act as a shield, reducing the possibility that minor plate defects will cause a short circuit.

c. Other Laminate Hybrids—It is imagined that other laminate systems, whether nonwovens or other glass mats could be utilized in conjunction with a flat PE separator membrane to make an acceptable VRLA separator.

The inventive lead-acid storage battery may be required not only to supply power as a main power supply for electric cars, but also to provide a new function as a power supply for starting and recovering regenerative current for hybrid electric cars, simplified hybrid cars and ISS-compatible cars having an idle stop and start (ISS) function.

The complete description and drawings of separators with negative cross ribs of various configurations and methods of U.S. patent application Ser. No. 61/253,096, filed on Oct. 20, 2009, entitled "LEAD ACID BATTERY SEPARATORS WITH CROSS RIBS AND RELATED METHODS" and of pending U.S. patent application Ser. No. 12/904,371, filed on Oct. 14, 2010, entitled "BATTERY SEPARATORS WITH CROSS RIBS AND RELATED METHODS" are each hereby fully incorporated by reference herein.

Figure 25:
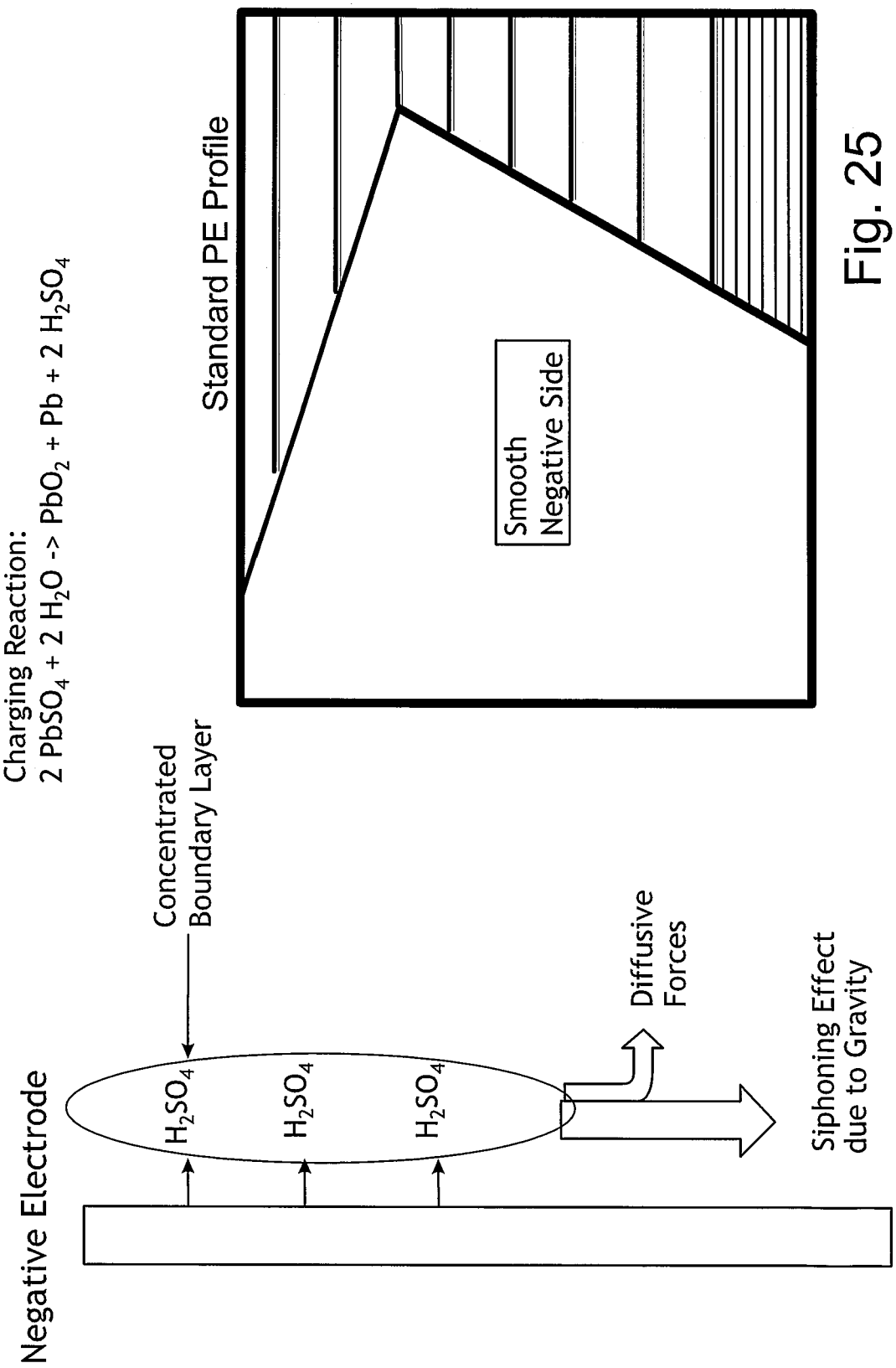

To maintain and even improve the runability of the separator, we propose to increase the bending stiffness of the separator with tightly spaced transverse ribs on the side of the separator facing the negative electrode. (See FIGS. 5 and 26) Multiple tests on commercial envelopers with Daramic Duralife® separators which include the negative cross ribs have shown substantial improvements in processing yields when comparing separators with the standard flat surface. (See FIG. 25) Increasing the bending stiffness results in improved enveloper processing and now we consider separators with thinner baseweb or backweb (BW) thickness such that we can foresee further decreases in separator electrical resistance by as much as 25%.

By decreasing the separator thickness, we see a two-fold benefit to the battery performance. First off, with 25% lower separator electrical resistance; the result will be improved power delivery and charge acceptance of the battery. Second, with less volume occupied by the separator, there will be more acid between the electrodes. As many batteries are designed to be electrolyte starved, replacing separator mass with acid can only yield benefits in terms of electrical storage capacity of the battery.

Figure 7:
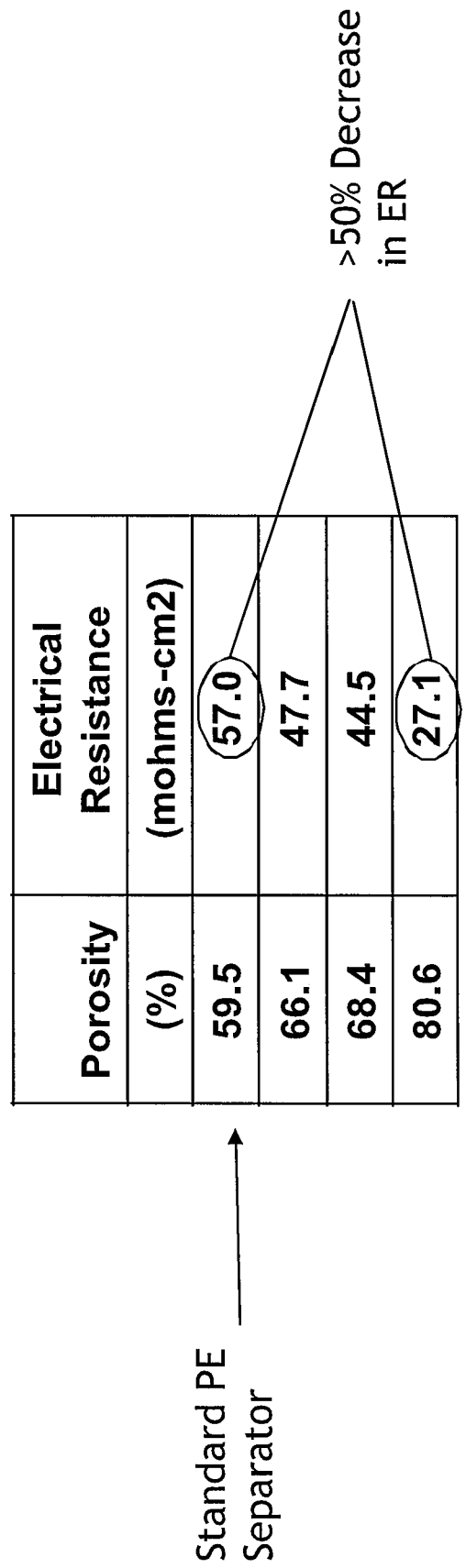

There are other considerations for lowering separator electrical resistance and increasing the amount of acid between the electrodes. Today, the typical PE separator has a porosity of 60%, or to say it another way, 40% of the separator volume is occupied by mass. If we reduce the mass of the separator by half, say to 20%, the electrical resistance will be reduced in similar proportion and result in 80% separator porosity. To confirm our assumptions we have produced experimental separators with varying porosity and measured the resultant electrical resistance. (See FIG. 7)

By utilizing a special type of silica (high surface area), the PE separator can be made with very high porosity and result in lower electrical resistance. The preferred separator with the ultimate lowest electrical resistance could be constructed by marrying the negative cross rib with the thin BW thickness and very high porosity (new silica).

Figure 8:
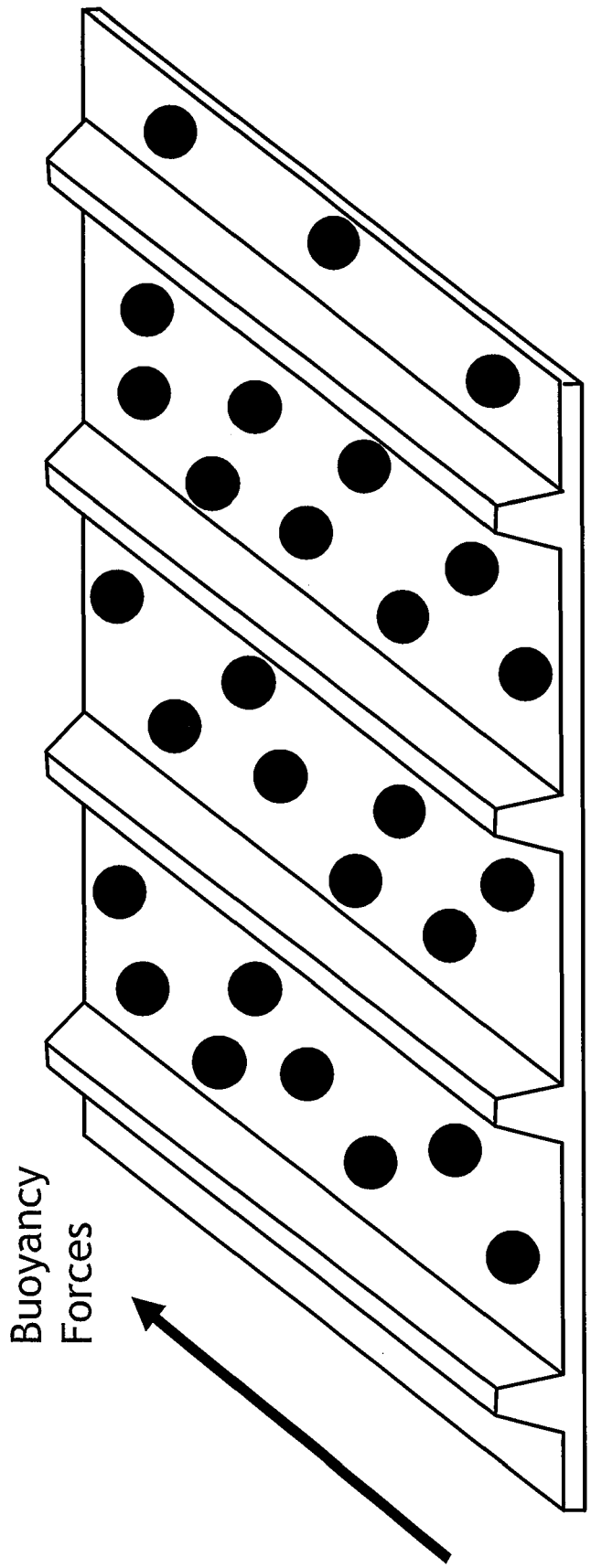

There is another method that we think will lower the functional electrical resistance of the separator thus yield improvements in battery performance. We purposely used the term 'functional' electrical resistance and this we want to compare to the 'measured' electrical resistance of the separator. (See FIGS. 8 and 10) Today the separator electrical resistance is often quantified with a device where voltage is applied across a single paired electrode chemical cell. The resistance is measured with and without the separator between the electrodes thus quantifying the electrical resistance of the separator. Though this method is of value for predicting the influence of the separator on battery performance, we think there is an important element missing, namely gas entrapment.

During formation or a charging event, once the electrodes are charged, oxygen and hydrogen are produced at the positive and negative electrodes respectively. As electrolyte quickly becomes saturated with these gases, bubbles are produced. As these bubbles in the electrolyte form they will coalesce and finally rise to the surface of the electrolyte similar to the carbon dioxide in a freshly poured glass of beer. However, the process of evacuating the gases is relatively slow and the impact upon battery performance is profound. Like the glass of beer, these tiny bubbles attached to various surfaces including that of the separator. Where the bubbles are attached there is a lack of electrolyte and these regions become areas of high resistance. Therefore, the 'functional' electrical resistance of the separator can be described as the measured electrical resistance and with the proportion of the surface area that is blinded by these gas bubbles taken into account.

To measure the entrapped gas, cells were prepared with standard and modified separators. (See FIG. 9) After formation and overcharging the electrolyte level was recorded for each cell, a vacuum was pulled to evacuate the gases; the difference in level is what we define as the entrapped gas. To establish a base line, cells were tested without separators; instead glass rods were used to maintain electrode spacing. From this work we can gain information regarding the amount of gas entrapment associated with the electrodes. As you can see from the below Table 5, adding standard separators more than doubles the amount of gas trapped when compared to cells without separators. With the modified separator, namely Daramic Duralife® with negative cross ribs, we can reduce the gas entrapment associated with the standard separator by approximately 50%.

TABLE 5

| Description | Height Change after gas evacuation (mm) | Est. Gas Volume (cc) |
| --- | --- | --- |
| Cell with no separator (glass rods) | 6.9 | 52.3 |
| Cell with standard separator | 15.6 | 118.0 |
| Standard separator (Minus Plate) | | 65.7 |
| Cell with no separator (glass rods) | 6.9 | 52.3 |
| Cell with DuraLife ® separator | 11.6 | 87.8 |
| DuraLife ® separator (Minus Plate) | | 35.5 |

Earlier, we proposed methods for lowering separator electrical resistance by adding negative cross ribs to improved enveloper runnability, which opens the door for processing separator materials with thinner backweb thickness than are currently available today. Initially one might be concerned that the negative cross ribs would actually increase gas entrapment. It is important to note here that the negative cross rib was one of the changes included with the Daramic Duralife® separator which had less gas trapped than the standard separator. We have theorized that the negative cross rib pattern may serve as a medium for coalescence of the small gas bubbles into larger bubbles so that the buoyancy forces become greater than the surface adhesion forces and allow the gases to escape faster than when using standard separators.

Thus far, we have demonstrated methods to lower the electrical resistance by 25 to 50% as compared to standard separators with two independent actions. Through our testing we have also found methods to reduce the amount of gas entrapped on the separator surface by more than 40% which should yield an equivalent reduction in functional separator electrical resistance. By combining all these changes together, one could expect to see the functional resistance decrease to 50 to 25% of the typical separator value. This can provide improvement for power delivery and charge acceptance in Micro Hybrid batteries, ISS batteries, etc.

We proposed that the Micro Hybrid battery was a cross between a high power automobile battery and a high energy deep cycling battery. So let us spend a few minutes considering improvements to the deep cycling aspect required in the application. When a lead acid battery is cycled frequently or deeply the positive active material will shed, the negative active material will sulfate, the negative lugs may thin, the acid is likely to stratify especially when operated in a partial state of charge and finally hydration shorts may develop through the separator. Many design options are being explored to address these situations but let's review those associated with the separators. If we can keep the active material in place longer, then we can extend the functional life of the battery. To prevent shedding of the active material, there are two options: First the number of ribs on the separator can be increased thus providing more points of contact for keeping the positive active material in place; and, Second is to add a laminate, such as glass-mat to the separator.

The laminate provides a positive support to prevent the shedding of positive active material. However these laminates must be carefully selected so as not to increase gas entrapment, which will increase the functional electrical resistance, and lower power delivery and charge acceptance of the battery. Utilizing the method previously described, we conducted gas entrapment tests on separators with various laminates. From the laboratory work, we first determined the amount of entrapped gas associated with the plates and the separator so that we can see the influence of various laminates. From the testing we can see vast difference between various laminates with regard to level of gas entrapment. Therefore to maintain good charge acceptance and power delivery, while maintaining good protection against shedding of positive active material we believe it is necessary to select the correct laminate. (See FIGS. 12 and 13)

There is another point of synergy between cycling and good electrical performance. In our earlier work we identified methods to increase the electrolyte between the electrodes. This was achieved by lowering the separator backweb thickness, increasing the separator porosity and decreasing the amount of entrapped gas on the separator. In general, we believe that these steps will also prevent hydration shorts, the onset of acid stratification and the sulfation of the negative electrode. Thus we believe that more acid between the plates will improve charge acceptance, power delivery and extend the functional life of the battery used in a micro-hybrid application.

To that end, we have put forth separator concepts that will yield battery improvements. To improve power output and charge acceptance of the battery, methods to lower the separator electrical resistance which includes 1) Implementation of negative cross rib, with the Duralife® Separator, allowing for the enveloping of thin separators and 2) Methods to substantially increase the porosity of the separator and drastically decrease the electrical resistance. The aforementioned modifications will also serve to increase the available acid between the plates and thus increase the electrical capacity of the battery when electrolyte limited. To also increase the amount of acid between the plates, we proposed methods for encouraging the gas coalescing and evacuation which will lead to better electrical performance.

To extend the functional performance of the lead acid battery especially in deep cycling applications, we proposed increasing the number of ribs to provide more contact points for the positive active material which is more likely to shed during heavy cycling. Another method to prevent the shedding of the active material is to add a laminate to the separator. However this laminate should be carefully selected to minimize the amount of gas entrapped and thus yield the maximum power delivery and charge acceptance of the battery. There is more to be said on extending cycle life by minimizing the onset of acid stratification or preventing hydration shorts through the separator. (See FIG. 14).

We believe these new concepts developed for the micro hybrid application can be applied immediately to existing products serving current market needs. For instance, improved enveloper runnability will be well received benefit to the battery manufacturer looking to further improve plant efficiencies. Separator modifications that reduce the amount of gas entrapment and thus yield improved power and electric functionality can be benefit to a battery manufacturer struggling to make ratings of an existing battery.

The present invention may be well suited for microporous material (e.g. pores less than 1 micron), but it also applies to other porous and macroporous (e.g. pores greater than 1 micron) materials including separators made from rubber, PVC, synthetic wood pulp (SWP), glass fibers, cellulosic fibers, polypropylene, and combinations thereof.

In accordance with at least selected embodiments or aspects, the present invention is directed to improved, unique, and/or high performance ISS lead acid battery separators, such as improved ISS flooded lead acid battery separators, ISS batteries including such separators, methods of production, and/or methods of use. The preferred ISS battery separator of the present invention addresses multiple separator properties simultaneously and may include negative cross ribs and PIMS minerals.

The present invention is not limited to separators for ISS flooded lead acid batteries, such as polyolefin separators, preferably filled polyethylene separators, but also applies to separators for capacitors, accumulators, gel batteries, polymer batteries, carbon batteries, battery/capacitor combinations, electrochemical cells, porous membranes, porous films, porous laminates, coated membranes, and combinations thereof.

In accordance with at least selected embodiments or aspects, the present invention is directed to improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, and/or methods of use.

Where current separator technology has addressed one or two key properties in discrete separators, one possibly preferred battery separator of the present invention addresses and optimizes multiple separator properties simultaneously. It is believed that in accordance with at least certain embodiments, the present invention is the first to recognize the need to address multiple separator properties simultaneously, the first to choose particular multiple separator property combinations, and the first to produce commercially viable multiple property battery separators as described below.

In order to reduce fuel consumption and generation of tail pipe emissions, auto manufacturers have implemented varying degrees of electrical hybridization. One form Hybrid Electric Vehicle (HEV) is often referred as the 'Micro HEV' or 'micro-hybrid'. In such Micro HEV or concepts, the automobile has the idle stop/start (ISS) function and often regenerative braking. In order to keep costs down, many auto manufacturers are considering a flooded or enhanced flooded lead acid battery (EFB) to meet the electrical functionality associated with the ISS function. As the functionality associated with this battery is often different than a standard automotive application, such as Starting Lighting and Ignition (SLI) battery, this may result in different functions or preferred performance of the ISS or micro-hybrid battery separator.

In accordance with at least selected embodiments or aspects, the present invention is directed to improved, unique, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, and/or methods of use.

Although one possibly preferred embodiment may be a vented or flooded lead acid battery, it is understood that the battery may be an enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, "acid-starved" design battery, "recombinant" battery (the oxygen evolved at the positive plate will largely recombine with the hydrogen ready to evolve on the negative plate to create water), polymer, carbon lead acid, or other battery, a capacitor, a super capacitor, an accumulator, a battery/capacitor combination, and/or the like.

Also, the improved separator of the present invention may find special applicability in ISS batteries, ISS systems, ISS vehicles, or may be used in other batteries or devices.

The advent of Micro HEV and ISS with or without regenerative breaking sets new demands on the battery and the battery separator. Such new demands may be addressed or met by at least certain embodiments of the separators, batteries, systems, or methods of the present invention.

The ISS flooded lead acid battery will be operated in a partial state of charge (PSoC), approximately 50 to 80% unlike the typical SLI battery which is usually operated at 100% state of charge. With regenerative braking and frequent restarting, the battery will experience shallow charge and recharge cycles. Depending on the design of the electrical system, the ISS battery may not normally go into overcharge and thus generate oxygen and hydrogen gas which can be useful for acid mixing.

Lead acid batteries continue to grow and expand into new applications. One growing category of application is referred to as deep cycling, where the battery is frequently and deeply discharged. Examples of such applications include micro-hybrid vehicles for instance, those associated with idle-start-stop, power back-up, renewable energy associated with wind or solar and traction, such as used to power electric fork trucks, golf carts or the like.

As lead acid batteries are being used in these deep cycling applications, there is much work underway, especially associated with use in micro-hybrid vehicles to improve fitness for use. To that end, scientist are exploring various options to improve the conductivity and utilization of the active mass, prevent the deleterious effects of sulfation, minimize grid and lug corrosion, and prevent active material shedding, just to mention a few. (See FIG. 16) Even though the lead acid battery has been commercially utilized for over 100 years, advances are still being made.

In accordance with at least certain embodiments or aspects of the present invention, new, improved, high performance, and/or complex performance separators can bring positive impact on extending the functionality of the lead acid battery in these deep cycle applications. As with the larger battery industry, much of the research work has recently focused on developing separators for micro-hybrid vehicles, but we believe many of these advances will also be beneficial to the broader deep cycling market. To provide context, we start with the historic gains made in separator designs and finish with recent work or work that is currently underway.

Figure 18:
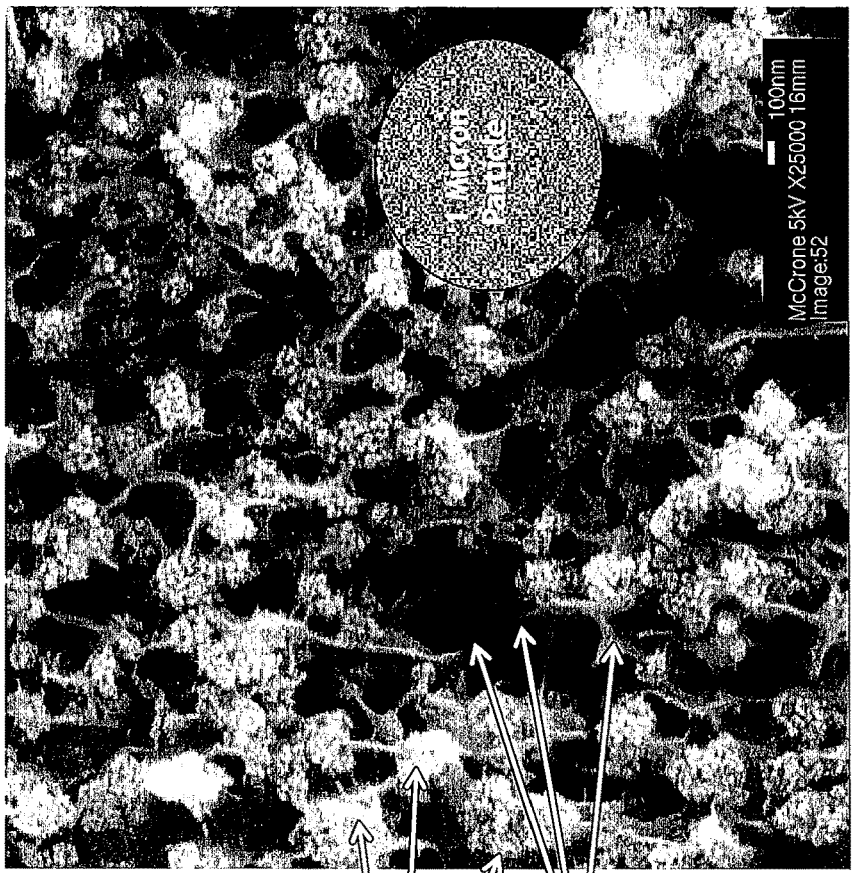

Historically, and with reference to FIG. 17, lead acid batteries used separator constructed of wood shingles, rubber, sintered PVC, and impregnated cellulosic materials. As separators, these materials are in decline throughout the world for a variety of reasons. With reference to FIGS. 18 and 19, we focus on a few properties found in newer separators that ultimately replaced the older technologies: 1) Pore Size distribution, 2) Acid Displacement, 3) Oxidative Resistance and 4) Weld-ability. To understand the importance of pore size of the separator, we first should note that the lead particle used in the active material has an average diameter of 1 to 5 microns. In order to inhibit migration of the lead particle through the separator and thus hindering the formation of points of electronic conductance between electrodes there has been a shift away from the historic separator materials to those with sub-micron pores such as the PE separator. (See FIG. 18).

The next point raised is acid displacement and by this we mean to imply the volume that is occupied by the separator. The more volume the separator occupies, the less acid available between the electrodes. Less separator volume and more acid usually increases battery capacity and often may increase discharge rating, especially when limited by acid volume in the battery. Newer separator materials occupy less volume than their predecessors, and therefore they need to be more oxidative resistant in order to function through the intended life. Simply put, separators that allow for more acid between the plates are typically thinner in backweb thickness and thus need to better withstand oxidative attack.

The last point of historic interest is the ability to be formed into a pocket or sleeve. Often the functional life of a lead acid battery may be cut short due to mossing, side or bottom shorts. By mossing, we mean that active material has shed and formed a conductive bridge around the separator side or bottom, even when there is a mud room present. Separators that can be made into a pocket or a sleeve can greatly reduce or prevent these types of failures.

Figure 20:
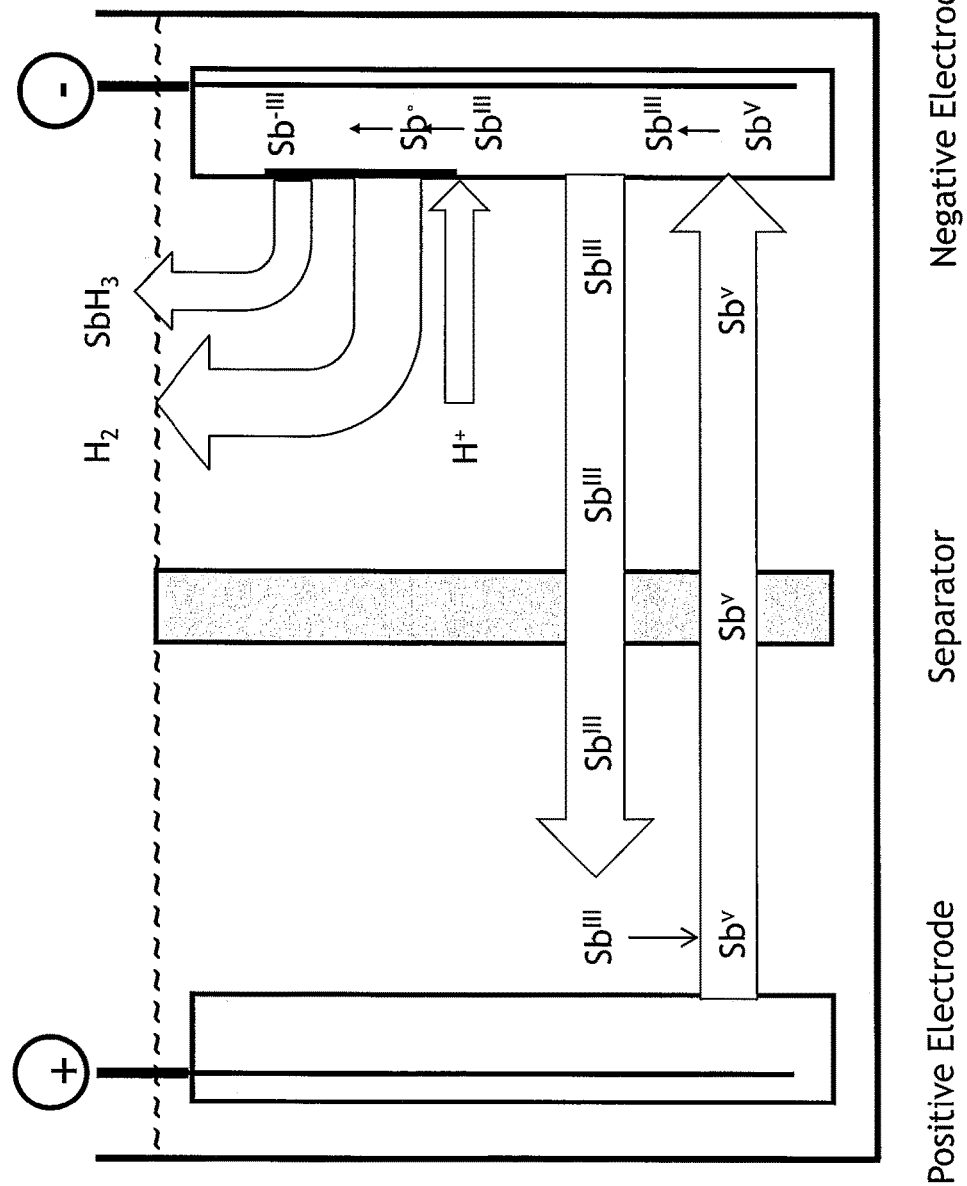

Thus far, we have been speaking of the functionality of the separator in its most basic terms to separate the positive and negative electrodes while allowing the free flow of ions and electrolyte. With reference to FIG. 20, we look at a more active function of the separator and that is suppressing what is often called antimony poisoning. During the life of the battery, a portion of the antimony that is added to the positive grid will become soluble in the electrolyte and then migrate and deposit on the surface of the negative electrode. The plating out of antimony will depolarize the negative electrode and thus put more voltage load on the positive electrode during charging. As the battery is charged, the antimony plated on the negative electrode will initiate the hydrolysis of water before the lead sulfate is converted back to spongy lead. Thus some portion of the charging current is not stored but wasted in producing hydrogen and oxygen from water.

To deal with this antimony issue, battery manufacturers have decreased the concentration of antimony or eliminated it completely. However in deep cycling applications, there are many positive benefits that result from an alloying with antimony. (See FIG. 21). As the battery is deeply discharged, the lead is converted to lead sulfate which is approximately 40% more voluminous and as such will lead to expansion in the cell. Antimony alloys increase the strength of the grid and prevent harmful deformations and which can ultimately assist to convert the lead sulfate back to lead during charging. Next, it has been found through experience that antimony alloys improve the interface between active material and grid. With improved interface, one can expect more efficient use of active material and improved charge acceptance. The most notable reason for antimony is to lower or retard the corrosion rate of the positive grid. Without opening an advanced discussion in the science of metallurgy, antimony alloy is one typical design change to lower grid corrosion especially in batteries that are frequently discharged.

In accordance with at least selected embodiments or aspects of the present invention, battery manufacturers can take advantage of the aforementioned benefits associated with antimony and by selecting the appropriate separator any detrimental impacts can be dealt with. The appropriate or preferred separators are modified, new, improved, and/or complex performance PE separators. PE separators have been used for many years in deep cycling applications such as motive power, inverter batteries, golf cart, and renewable energy and even in SLI applications with stringent OEM specifications for low water loss. Thus when using antimony alloys, it is important to select the appropriate separator to fully utilize the benefits and mitigate any associate deleterious effects.

As stated earlier, many of the scientists associated with the lead acid battery industry have been acutely focused recently to meet the demands associated with the ISS or micro-hybrid vehicles. With reference to FIG. 22, the demands of the ISS or micro-hybrid application are a cross between the high power requirements associated with the SLI battery and the deep cycling demands of the motive power applications.

Figure 23:
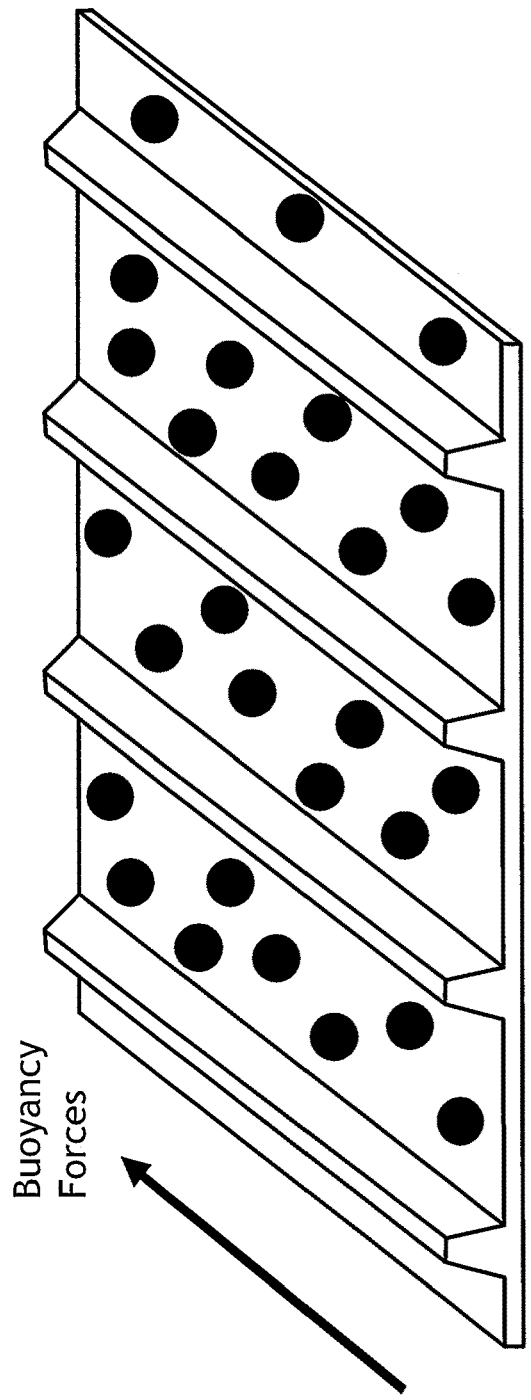

We start with looking at modifications to the separator that can yield more power in the battery. More power can be harvested from the battery as the internal resistance is reduced. By providing more acid between the electrodes limitation associated with diffusion can be solved and also yield more power. Separator resistance is often characterized outside of the battery in a laboratory device. Though the value derived from such a device is generally useful, we think there is an important element missing, namely, gas entrapment. (See FIG. 23) In a flooded lead acid battery gas is generated to varying degrees depending on the charging current. This gas will ultimately escape the battery, but for a time it will adhere to the electrode and separator surfaces. Where the gas is adhered, this is effectively a dead zone for ionic conductance. We have found methods to effectively reduce the amount of gas attached to the separator by approximately 40%. By reducing the gas associated with the separator by preferably 40% or more, a significant improvement in the functional ionic resistance associated with the separator may improve the power performance of the battery.

Another method to improve the power of the battery is to increase the amount of acid between the electrodes. (See FIG. 24) In accordance with at least one embodiment or aspect of the present invention, this is preferably done via stepwise modifications to the separator. First, the oxidation resistance of the separator needs to be improved so that mass of the separator can be reduced without compromising the primary functionality, which is to prevent electronic shorting of the electrodes. With reduced mass, the separator still must have appropriate mechanical properties that allow it to be assembled into a battery. Two such properties are the resistance to puncture and bending stiffness. Once care is taken to improve the oxidation resistance while maintaining appropriate levels of puncture resistance and stiffness, the separator mass can be reduced to increase the volume of electrolyte between the electrodes. With more acid available between the electrodes, the battery is less likely to encounter limitations associated with acid diffusion and thus improve the power output. The table in FIG. 24 shows a comparison between selected standard Daramic® HP and DuraLife® separators, being offered now by Daramic, LLC of Charlotte, North Carolina for micro-hybrid battery applications.

In comparing the two separators, we can see that the DuraLife® separator demonstrates a substantial increase in oxidation resistance, while maintaining high puncture resistance that is found in Daramic® HP and this was accomplished with approximately 15% less mass. Less mass of the separator, also means less acid displaced by the DuraLife® separator and thus more acid between the plates. Manufacturers focusing on micro-hybrid applications are finding batteries built with Daramic® DuraLife® separators have lower battery resistance and higher power output during rapid discharge when compared to standard PE separators.

Another major challenge associated with the micro-hybrid application is the ability to extend the cycle life of the battery. Batteries in this application are often operated under a partial state of charge, discharged to varying degrees depending on the duration of time the vehicle is at a stop and the amount of electrical duty during such a stop without being fully recharged between discharges.

Besides delivering a quick boost of power to restart the engine after various stops, the battery may also experience tens of thousands of shallow cycles over the expected life of the battery. As these batteries are cycled there is an opportunity for an acid gradient to develop. (See FIG. 25) With the acid concentrating in the bottom of the cell, the electrochemical reactions will be more limited to the upper portion of the electrode and this will lead to premature capacity loss. In deep cycle applications, sufficient overcharge will create gas bubbles that will assist in mixing the acid and preventing acid stratification. However in applications where the battery is seldom if ever fully charged, such as ISS, other means should be applied to prevent acid stratification.

To employ other means to prevent acid stratification, it is important to first understand the mechanism for why it is created. As electrical current is applied to a battery in a partial state of charge, lead sulfate is converted and a high concentration of sulfuric acid initially forms at the plate surface. At this instant, a boundary layer of sulfuric acid will set-up adjacent to the plate surface. As this acid layer is more concentrated than the bulk acid, there will be a driving force to diffuse or mix with the lower concentrated acid in the bulk space. Beside the forces of diffusion, the forces of gravity will also be active on this boundary layer. Unfortunately, highly concentrated sulfuric acid may be 10 to 20% heavier than the bulk acid and this boundary layer will act like a denser column and result in the acid concentrating the bottom of the cell. This tendency toward acid stratification is especially seen in flooded batteries operated in a partial state of charge where the acid is not immobilized by the separator. Upon charging in a VRLA battery, the concentrated acid produced at the electrode surface immediately comes into contact with the glass fibers that fill the entire space between the electrodes and the capillary action of the intersecting fibers provides a counter force to gravity diminishing the tendency for the acid to stratify.

With the introduction of the DuraLife® separator, there are design changes that we believe help minimize acid stratification in a flooded lead acid battery and in fact battery tests are confirming the positive results. First and foremost, the DuraLife® separator occupies approximately 15% less volume than traditional separators. Thus, between the electrodes more acid will be available which is important to maximize electrical performance. The next design parameter to note is the preferred negative cross rib configuration. (See FIG. 26) Typically, the surface of the separator that is facing the negative electrode is either flat or has mini-ribs in the vertical (or longitudinal) direction. (See FIG. 25)

With reference again to FIG. 26, the preferred negative cross rib design associated with the DuraLife® separator has a multitude of small mini-ribs in the horizontal (or transverse) direction. It is believed that the electrolyte is immobilized to a degree as there are a multitude of small mini-ribs in the horizontal direction. (See FIG. 26) These negative cross ribs provide a mechanical barrier different but synonymous in function with the AGM separator that will hinder the acid gradient from developing. If you like, the negative cross rib design creates upwards of hundreds of mini-transverse dams to keep the heavier acid from flowing downward.

Besides preventing acid stratification, the design of the negative cross rib may also assist in another area. In a rapid discharge, the rate of diffusion of acid into the negative electrode is often a limiting factor when high power is required. Therefore, the negative cross rib design creates hundreds mini dams, which in turns creates hundreds mini pools of acid uniformly across the surface of the electrode. Thus far, we have addressed the possible mechanisms for preventing acid stratification and improving power delivery. The DuraLife® separator has been found to improve power delivery and reduced acid stratification in Micro-hybrid battery testing. With further testing, we will even better understand the various mechanisms and thus further enhance the contributions that the separator can add in these new applications.

Figure 27:
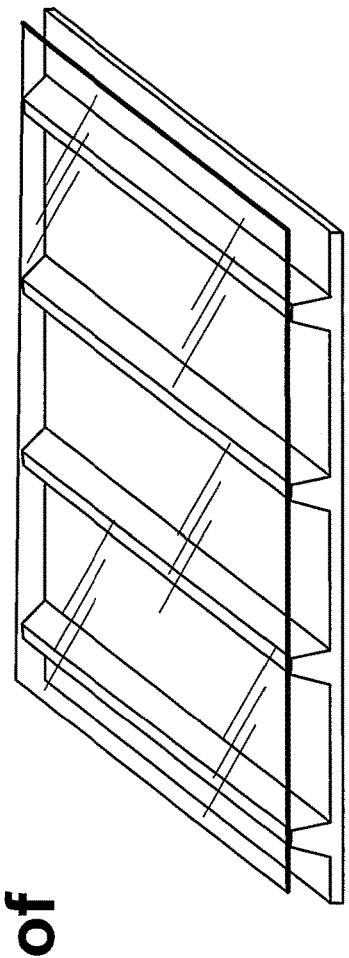
Figure 30:
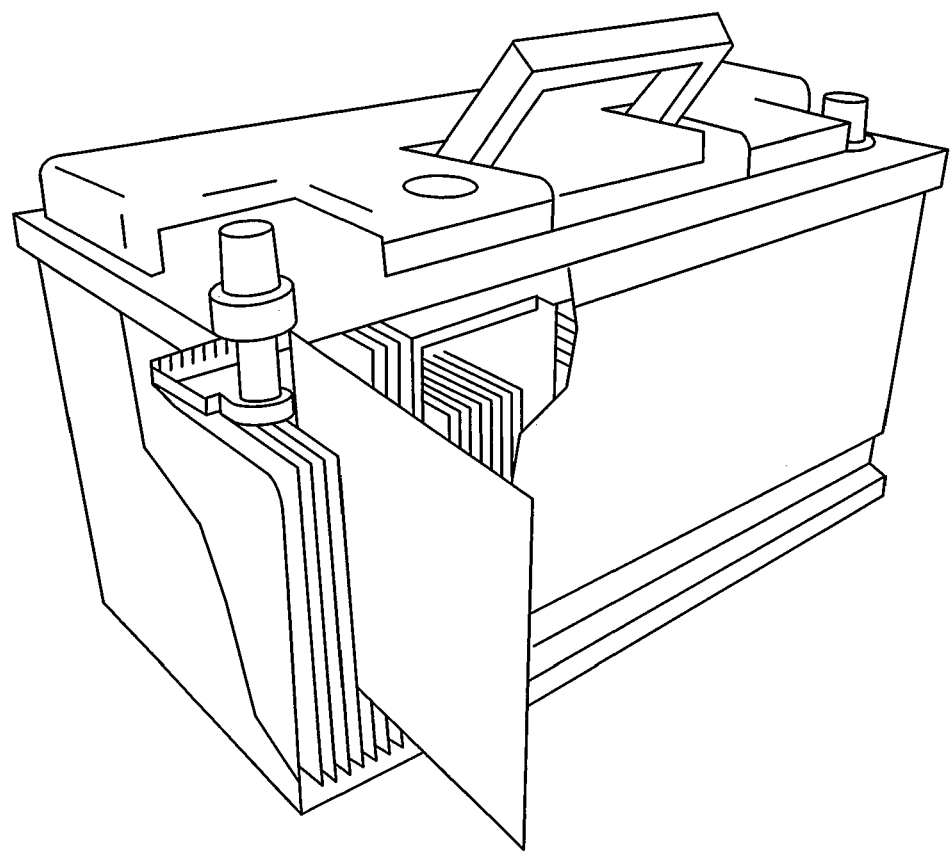

Another aspect to extending the life of a deep cycling battery is to inhibit the shedding of the positive active material. To that end, separators are often combined with a non-woven laminate such as a glass mat. (See FIG. 27) The laminate structure is typically applied to the surface of the separator which is in direct contact with the positive electrode. For years this has been a typical commercial approach for extending the functional life of deep cycling batteries. However, the old laminate structure lowered the power output of the battery. In micro-hybrid batteries, the application requires that we simultaneously improve both the cycling ability and the power output.

Thus, work has recently been undertaken to optimize laminate structures for micro-hybrid applications. First, the laminate should maintain the mechanical properties to prevent shedding of the active material over the intended life of the battery. To meet this requirement, the laminate should be constructed with a fiber structure and of materials that are resistant to oxidative attack. Second, the laminate should displace as little acid as possible and thus ensure maximum availability of acid. Displacing as little acid as possible implies that the material is of the lowest basis weight. As the basis weight decreases, the mechanical properties usually also decline. Thus the challenge was and is to optimize the properties simultaneously. There is another challenge created by low basis weight laminates which is the point of bonding of the two materials (separator, laminate). A normal technique for combining the materials is to apply adhesive to the rib surface of the separator and the laminate, but with thinner laminates, the adhesive will often wick to the next layer and create processing problems. Another bonding approach is to sonically weld the laminate structure to the rib top and thus eliminate the adhesive from the system all together. This kind of approach may only be practical when the laminate has a sufficient amount of synthetic fibers in the mat.

There is another laminate criterion that is not inherently obvious but can substantially limit the energy conversion of the battery, namely gas entrapment. Anytime a lead acid battery is overcharged, hydrogen and oxygen are formed due to the hydrolysis of water. In a flooded battery, these gases will ultimately escape. However, for a time, these gases will adhere to the surfaces of the electrodes, separator and especially to the laminate structure incorporated to extend the cycle life of the battery. As the gas is entrapped, the electrolyte is pushed out of the space between the electrodes as demonstrated by the raise in the height of the electrolyte in the battery. As gases are a terrific insulator, the paths of ionic conductance are greatly reduced. Thus optimization of the laminate to minimize gas entrapment is possibly critical for maximizing power and electrical capacity of the lead acid battery either in deep cycle or micro-hybrid applications.

With reference to FIG. 28, a recap is in order. Over the past 100 years lead acid batteries have advanced mostly in an evolutionary manner to the various demands of new applications. To meet these demands, changes have occurred in materials of construction, including the separators. Over this time, separators have migrated toward synthetic materials of construction such as Ultra High Molecular Weight Polyethylene (UHMWPE). These synthetic materials have allowed the separator to be micro-porous for short prevention, improved the oxidation resistance to extend the life, and to be envelope-able so as to prevent side and bottom shorts. These new types of PE separators have offered the potential to add other functionality such as the incorporation of additives into the separator to prevent antimony poisoning and decrease the associated water loss.

To meet new market opportunities such as micro-hybrid, we are sure changes have been and will be required to the materials of construction including the separator. (See FIG. 29) The micro-hybrid application requires high power to crank the engines as is found in traditional SLI batteries and the frequent cycling found in deep discharge batteries. To enhance power, we have preferably changed the separator to increase the available acid and lower the electrical resistance by minimizing the gas entrapment of the separator. To extend battery life, we have preferably immobilized the acid and thus prevented the onset of acid stratification. Next, we added laminates to keep the active material in place. These design changes preferably focus on optimizing three properties of the laminate simultaneously: basis weight, mechanical properties and gas entrapment. Not only have design changes been made and proposed, but at least certain of the separator and laminate changes have also been validated to improve the performance of micro-hybrid flooded batteries.

Meeting the challenges associated with the micro-hybrid application may have benefits in other applications currently served by lead acid batteries. For instance, modifications to the separator to minimize acid stratification, reduced gas entrapment, maximize acid amount, reduce electrical resistance and extend cycle life can all be directly transferrable in current battery applications. These evolutionary changes produced a revolutionary separator, and associated with the inherent favorable cost structure verses competing technologies, make the lead acid battery an excellent choice for the developing ISS and micro-hybrid markets.

In accordance with at least selected embodiments, the preferred new, improved and/or complex performance separator, such as a deep cycle or ISS or micro-hybrid separator, has features that help minimize acid stratification in a flooded lead acid battery, occupies approximately 15% less volume than tradition separators, has negative cross ribs, has a multitude of small mini-ribs in the horizontal direction, has a mechanical barrier that will hinder an acid gradient from developing, has hundreds of mini dams to keep heavier acid from flowing downward, has hundreds of mini dams which create hundreds of mini pools of acid uniformly across the surface of the electrode, that improve power delivery and reduce acid stratification in micro-hybrid batteries, and/or the like.

In accordance with at least selected objects of the present invention, there is provided improved, unique, high performance, and/or complex performance battery separators, lead acid battery separators, flooded lead acid battery separators, enhanced flooded lead acid battery separators, ISS or micro-hybrid battery separators, ISS flooded lead acid battery separators, ISS enhanced flooded lead acid battery separators, batteries including such separators, systems or vehicles including such batteries or separators, methods of production, methods of use, and/or the like. FIGS. 31 to 34 are directed to leaf or piece type separators. FIG. 31 is a schematic perspective view representation of an exemplary lead acid battery, with parts broken away, illustrating an outward placement of a leaf or piece separator such as the Daramic® Auto PE Leaf Separator or the Daramic® Industrial PE Leaf Separator of FIG. 33. The Daramic® PE Leaf Separators of FIG. 33 are shown with optional glassmat laminate (see the respective enlarged end views).

In accordance with at least selected embodiments, the present invention is directed to new or improved batteries, separators, components, and/or compositions having heavy metal removal capabilities and/or methods of manufacture and/or methods of use thereof. In accordance with at least certain possibly preferred embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and/or methods of manufacture and/or methods of use thereof. In accordance with at least possibly more preferred particular embodiments, the present invention is directed to new or improved lead acid batteries, lead acid battery separators (single or multi-layer), lead acid battery components (such as battery casings, battery parts, porous bags, laminates, coatings, surfaces, fillers, electrode formulations, electrolytes, and/or the like) and/or polymer or resin compositions having heavy metal removal capabilities and utilizing at least one PIMS mineral as at least one filler component therein. In accordance with at least one particular microporous lead-acid battery separator embodiment, the PIMS mineral (preferably fish meal, a bio-mineral) is provided as at least a partial substitution for the silica filler component in a silica filled lead acid battery separator (preferably a polyethylene/silica separator formulation). In accordance with at least certain embodiments or examples, the invention is directed to battery separators, to methods of manufacture of battery separators, to methods of use of battery separators, to improved battery separators, and/or to improved separators or laminates for lead acid batteries.

In accordance with at least selected embodiments, the present invention is directed to new or improved batteries, separators, components, and/or compositions having heavy metal removal capabilities and/or methods of manufacture and/or methods of use thereof. In accordance with at least certain possibly preferred embodiments, the present invention is directed to new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and/or methods of manufacture and/or methods of use thereof. In accordance with at least possibly more preferred particular embodiments, the present invention is directed to new or improved lead acid batteries, lead acid battery separators (single or multi-layer), lead acid battery components (such as battery casings, battery parts, porous bags, laminates, coatings, surfaces, fillers, electrodes, electrode formulations, electrolytes, and/or the like) and/or polymer or resin compositions having heavy metal removal capabilities and utilizing at least one source of natural or synthetic hydroxyapatite having heavy metal binding capabilities, preferably at least one PIMS mineral as at least one filler or component therein or thereon. In accordance with one particular microporous lead-acid battery separator embodiment or example, the PIMS mineral (preferably fish meal, a bio-mineral) is provided as at least a partial substitution for the silica filler component in a silica filled lead acid battery separator (preferably a polyethylene/silica separator formulation).

In accordance with at least selected embodiments of the present invention, a believed novel concept of utilizing "Phosphate Induced Metal Stabilization" (PIMS) minerals as a filler component within a microporous lead-acid battery separator is provided. In accordance with one particular embodiment or example, the PIMS mineral (preferably fish meal, a bio-mineral) is provided as at least a partial substitution for the silica filler component in contemporary silica filled lead acid battery separator (preferably a polyethylene/silica separator formulation).

As mentioned above, a common failure mode within the lead-acid battery industry is the phenomenon of "hydration shorts". In accordance with at least selected embodiments, the present invention is directed to new or improved batteries, separators, components, and/or compositions having heavy metal removal capabilities that address, delay, reduce, or eliminate the phenomenon of "hydration shorts".

In accordance with the present invention, a variety of PIMS minerals have been identified and some of which have been evaluated for lead affinity (see Tables I and II below). A PIMS mineral derived from fish bone (such as commercial, lab ground fish meal) has been shown to have the greatest affinity for lead ion over the other samples evaluated. The fish bone or fish meal powder was extruded via pilot operation into a typical lead-acid battery separator format at several loading concentrations. The resulting PIMS incorporating separator was evaluated for lead removal efficiency; the separator demonstrated substantial reduction of lead concentration in acidic solution. For example, % Pb reductions of about 17% to 100% were demonstrated. It is preferred that the fish bone powder be added to substitute for the silica filler at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica filler at substitution levels of about 1% to 50% or more of the silica, more preferably about 5% to 30%, and most preferably at about 10% to 20%.

It is believed that this is the first commercial use of a bio-mineral in a battery separator, in an extruded polyolefin polymer resin, and in a porous polymer film or membrane.

In accordance with at least selected embodiments, lead reduction is achieved by incorporating PIMS minerals in lead-acid battery separators, preferably incorporating PIMS mineral derived from fish bone.

The present invention represents a novel microporous membrane substrate with chemically active properties. A range of various chemically active or reactive mineral fillers are available and amenable to the separator extrusion and extraction process. These minerals are available at low cost in desired purity and in the case of fish bone (or fish meal) are industrial by-products available from multiple sources. Advantages include low cost of raw material as well as identified battery manufacturer need to streamline existing production processes involving sodium sulfate.

The preferred separators are microporous materials (e.g. porous less than 1 micron). Nonetheless, other materials such as porous or macroporous materials are contemplated. For example, macroporous separators (e.g. pores greater than 1 micron) would include separators made from rubber, PVC, synthetic wood pulp (SWP), glass fibers, cellulosic fibers, polypropylene, and combinations thereof.

In accordance with at least selected embodiments, the battery may be a lead acid or lead calcium battery such as a vented or flooded lead acid battery, enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, recombinant battery, polymer battery, carbon lead acid battery, or other battery, capacitor, super capacitor, accumulator, battery/capacitor combination, and/or the like. The preferred battery is a vented or flooded lead acid battery.

In accordance with at least selected embodiments, the battery separator may be a lead acid or lead calcium battery separator, such as a flexible or rigid separator, a pocket, envelope, sheet, piece or leaf separator, a single or multi-layer separator, a composite or laminate separator, a separator for a vented or flooded lead acid battery, enhanced flooded lead acid battery (EFB), valve-regulated lead-acid (VRLA) battery, low-maintenance lead-acid rechargeable battery, absorbed glass mat (AGM) battery, VRLA AGM battery, gel battery (gel cell), VRLA gel battery, sealed lead-acid battery, recombinant battery, polymer battery, carbon lead acid battery, or other battery, capacitor, super capacitor, accumulator, battery/capacitor combination, and/or the like. The preferred battery separator is a vented or flooded lead acid battery separator.

Hydroxyapatite is a mineral with demonstrated heavy metal binding capabilities. Hydroxyapatite can be produced synthetically and purified as a nano-crystalline material. Hydroxyapatite is found within the skeletal mass of many naturally occurring plants and animals (as well as a minor constituent of naturally occurring minerals such as kaolinite). The most common animal-derived sources of hydroxyapatite are aquatic (fish, crustaceans, shellfish) and land-based from bovine and porcine sources. The most common plant-derived sources of hydroxyapatite occur in tea, kelp and various species of tree bark. As with all natural products, varying degrees of purity and potency may be expected. As an example, fish meal is commercially available in a range of purities based upon the level of digestion of non-skeletal remains. That is, fish meal may contain high amounts of protein from fleshy components that remain; this may be termed "high-nitrogen" fish meal. Fish meal that has been fully processed to fully digest proteinaceous matter, leaving skeletal content intact may be termed "high-phosphorus" fish meal.

Most animal and plant derived sources of hydroxyapatite are commercially supplied as coarse granular materials. In accordance with at least one embodiment, aspect or example of the present invention, in order to efficiently make use of the hydroxyapatite-bearing materials it is desirable to perform a milling (or grinding) operation to reduce the particle size and increase the effective surface area in an effort to promote optimal exposure of the heavy metal to the hydroxyapatite. The milling operation also promotes ease of particle incorporation into the battery by, for example, membrane extrusion, impregnating, coating, laminating, molding, sachet fabrication, or combinations of these technologies. It is preferred, for example, to achieve a D50 particle size of between 10 μm to 80 μm to achieve optimal condition for the incorporation of ground fish meal into a battery separator via twin screw extrusion methodology. The aforementioned particle size range is also desirable when incorporating natural hydroxyapatite materials into non-woven laminate-separator structures, impregnating, coating, molding, and bulk powder sachet-type delivery methods.

In accordance with at least selected embodiments of the present invention, it is preferred to compound the hydroxyapatite source (i.e. ground or milled fish meal) into the separator extrusion formulation (such as a polymer/silica/fish meal formulation or a polymer/silica/fish meal/oil formulation). Separators produced in this way offer the desired electrochemical performance attributes of known lead acid battery separators but surprisingly surpass the conventional separator capabilities by actively sequestering lead in solution. In deep discharge condition, the electrolyte contains an elevated level of reduced lead passing through the tortuous separator matrix and in accordance with at least selected embodiments of the present invention the separator comprises extrusion immobilized hydroxyapatite (fish meal) to sequester elemental lead prior to migration to the negative electrode. Therefore, in accordance with at least selected possibly preferred embodiments, sources of hydroxyapatite are preferably immobilized by incorporation into the separator extrusion process to exploit surface area contact probability and proximity to the electrode requiring protection.

Another approach to the incorporation of hydroxyapatite into the separator and/or battery is the inclusion of the reactive mineral into a laminate mat which is adjacent to the separator and/or attached to the separator by attachment means such as welding, spot welding, ultrasonic welding, adhesive, heat, heat and pressure, or other known processes. The laminate may be a glass mat and the fish meal or other source of hydroxyapatite may be mixed with a binder utilized during formation of the glass mat, coated on the mat, and/or impregnated in the mat. The fish meal or other source of hydroxyapatite may be co-extruded with the resin during the fiberization process thus allowing for inclusion into "carded" dry process non-wovens as well as wet-laid processes. Alternatively, the fish meal or other source of hydroxyapatite may also be used within synthetic non-woven materials, such as PBT, PET, PP, and/or the like by means of addition to the binder and/or by direct addition to the furnish prior to wet-lay fiber formation. This method also has utility in adding fish meal or other source of hydroxyapatite to cellulosic laminates such as "pasting papers". One or more sources of hydroxyapatite may also be incorporated on or in the separator by means of, for example, coated adhesion (after separator formation), direct inclusion (during formation), to both inorganic and organic fibrous laminate materials in contact with the separator, and/or combinations thereof.

Another approach to the incorporation of hydroxyapatite (such as ground fish meal) is to coat the fish meal directly to the positive and/or negative surface of the separator. An example of this method is to produce a slurry of the desired concentration, coat the positive or negative surface with the slurry by known coating means (dip, spray, roller, nip, etc.) and subsequently dry the slurry-separator article to insure immobilization of the fish meal during any prerequisite separator processing steps prior to the battery build and formation. Therefore, sources of hydroxyapatite can be applied by mixing with a vehicle, for example water (or other solvent or binder), to produce a slurry or mixture suitable for the application of a surface coating (preferably a porous coating).

Another approach to the incorporation of hydroxyapatite into the energy storage device is by compounding the reactive mineral, (e.g. fish meal), into the resin utilized in producing the container hardware for the battery itself (the case, supports, dividers, cover, and/or the like). Thus, some level of contact over time may occur with electrolyte solution and the surface of the resin case, supports, dividers, top cover and associated parts comprising the battery compartment. Additionally, parts comprising the battery compartment may be injection molded in such a way as to incorporate active material (the reactive mineral) such as fish meal into the inner or interior surfaces thereof at relatively elevated concentrations; this is generally referred to as "in-molding". Further, sachet devices whereby the hydroxyapatite is contained as a bulk powder within a porous, non-woven, paper, and/or plastic enclosure or another design allowing for the storage of hydroxyapatite in free electrolyte solution can be utilized to rapidly or over time release the active agent (reactive mineral) into the electrolyte (such as fish meal impregnated glass fiber, glass mat or other non-woven packing material, time release beads, a gel containing the reactive mineral, etc.). The direct inclusion of the hydroxyapatite in the electrolyte bulk storage may be utilized to provide a fixed dose of the ingredient during electrolyte filling immediately prior to battery formation or at any time during the battery manufacturing process. It is also possible to mix the hydroxyapatite (such as fish meal) into the electrochemically active material coating which is applied to the positive and negative electrodes respectively. The process of preparing the active material chemistries and the process of applying the active material to the electrode grids may be modified to include the addition of fish meal or other hydroxyapatite material (the reactive mineral may be included in the electrochemically active electrode formulations). Finally, hydroxyapatite may also have utility as an additive later in the life of the battery, for example, after a suggested service interval the battery is injected with a level of hydroxyapatite to increase service life through continued protection against depolarization of the negative electrode (and prevention of "hydration shorts").

In accordance with selected examples and testing of hydroxyapatite materials, the following Table I illustrates the unexpected results achievable with even low loading of hydroxyapatite (such as fish meal). For example, a 10% loading of fish meal as a substitution for silica filler in the battery separator of Sample G showed an amazing 72.6% reduction in lead in the 20 ml Pb solution.

TABLE I

| Sample | Composition | weight (g) | solution (ml) | Pb (mg/L) | % Change |
|---|---|---|---|---|---|
| A | Pb Standard Solution As received (~100 ppm from vendor) | N/A | 20 | 114 | Control |
| B | Hydroxyapatite mineral powder (Aldrich Reagent grade) | 0.7 | 20 | 0.614 | 99.5 |
| C | Calcium Phosphate tribasic powder (Aldrich) | 0.7 | 20 | 0.43 | 99.6 |
| D | Fish Meal (Commercial, lab ground) | 0.7 | 20 | 0.002 | 100.0 |
| E | Polyethylene separator w/Si:PE ratio of 2.6:1 (CONTROL) | 1.0 | 20 | 91.3 | 19.9 |
| F | Polyethylene separator as "E", above w/5% fish meal substituted for silica. | 1.0 | 20 | 94.6 | 17.0 |
| G | Polyethylene as "E", above but w/10% fish meal substituted for silica. | 1.0 | 20 | 31.2 | 72.6 |

Notes:
All samples were soaked without agitation in the Pb standard solution for 4 days prior to analysis at testing service.
The Pb standard solution (Fisher Scientific) is comprised of ~100 ppm (mg/L) Pb in a solution of Nitric acid and water. pH = 1-2
All solution samples were filtered free of particulate at testing service prior to testing.

The Sample E control separator (silica filled) showed a 19.9% reduction in Pb. However, the control separator data is subject to the reversible adsorptive removal mechanism of precipitated silica. As silica content is substituted for by the hydroxyapatite source (Sample F), the adsorptive mechanism is gradually disrupted and eventually replaced by the PIMS sequestration binding mechanism (Sample G). In other words, the reductions in Pb in Samples F and G are permanent binding (sequestration) as compared to temporary adsorption by Sample E.

The Sample B, C and D powdered (neat) samples were readily wet-out and immersed within the Pb assay solution; complete contact of powder to solution was observed. The Sample E, F and G separator membrane samples were treated with a commercially available surfactant at levels comparable to that utilized for typical lead-acid battery separators.

All separator membrane samples readily wet-out and immersed within the Pb assay solution; complete contact to the surface and underlying pores was observed.

In accordance with other selected examples and testing of hydroxyapatite materials, the following Table II illustrates the surprising results achievable with even low loading of hydroxyapatite filler (such as fish meal). For example, a 10% loading of fish meal as a substitution for silica filler in the battery separator of Sample L showed an unexpected 56.2% reduction in lead in the 20 ml Pb solution, while a 50% loading of fish meal as a substitution for silica filler in the battery separator of Sample M showed an amazing 99.6% reduction (substantially complete elimination) in lead in the 20 ml Pb solution.

The phosphorus level of all samples Post Exposure was tested and found to be below max acceptable levels.

TABLE II

| Sample ID | Actual ID | Weight (g) | Pb Standard (ml) | Pb Concentration Theoretical (ppm) | Pb Concentration Post Exposure (ppm) | Reduction in Control Pb Post Exposure (%) |
|---|---|---|---|---|---|---|
| A | Control Pb Standard | N/A | 20 | 100 | 95.4 | N/A Control |
| B | Hydroxyapatite Synthetic Mineral | 0.11 | 20 | 100 | 0.7 | 99.3% |
| C | Commercial Fish Meal Powder (High Phosphorous Type) | 0.11 | 20 | 100 | 0.1 | 99.9% |
| D | Commercial Beef Bone Meal Powder | 0.11 | 20 | 100 | 82.1 | 13.9% |
| E | Control Separator I (CSI) | 1.6 | 20 | 100 | 80.7 | 15.4% |
| F | 2% Beef Meal (CSI) | 1.6 | 20 | 100 | 90.9 | 4.7% |
| G | 5% Beef Meal (CSI) | 1.6 | 20 | 100 | 84.9 | 11.0% |
| H | 10% Beef Meal (CSI) | 1.6 | 20 | 100 | 82.5 | 13.5% |
| I | Control Separator II (CSII) | 1.6 | 20 | 100 | 72.6 | 23.9% |
| J | 2% Fish Meal (CSII) | 1.6 | 20 | 100 | 89.1 | 6.6% |
| K | 5% Fish Meal (CSII) | 1.6 | 20 | 100 | 78.9 | 17.3% |
| L | 10% Fish Meal (CSII) | 1.6 | 20 | 100 | 41.8 | 56.2% |
| M | 50% Fish Meal (CSII) | 1.6 | 20 | 100 | 0.3 | 99.6% |
| N | Commercial Loose Tea Leaves | 0.11 | 20 | 100 | 80.5 | 15.6% |

The Samples E and I control separators (silica filled ~70%) showed respective 15.4% and 23.9% reductions in Pb. However, the control separator data is subject to the reversible adsorptive removal mechanism of precipitated silica. As silica content is substituted for by the fish meal hydroxyapatite source (Samples J and K), the adsorptive mechanism is gradually disrupted and eventually replaced by the PIMS sequestration binding mechanism (Samples L and M). In other words, the reductions in Pb in Samples L and M are permanent binding (sequestration) as compared to temporary adsorption by Samples E and I.

The Samples B, C, D and N powdered (neat) samples were readily wet-out and immersed within the Pb assay solution; complete contact of powder to solution was observed.

The Samples E to M separator membrane samples were treated with a commercially available surfactant at levels comparable to that utilized for typical lead-acid battery separators.

All separator membrane samples readily wet-out and immersed within the Pb assay solution; complete contact to the surface and underlying pores was observed.

The Pb assay test method was carried out via ICP/MS EPA Method 200.8

All samples were static soaked without agitation for a period of 48-72 hours.

A group of inorganic (mineral) compounds are known to effectively bind heavy metals such as lead, cadmium, iron, zinc and copper. The mechanism by which the minerals bind heavy metals is termed "Phosphate Induced Metal Stabilization" (PIMS) and is widely utilized for the environmental remediation of contaminated soils and water. In environmental application, bulk quantities of minerals possessing PIMS affinity for toxic metals are mixed with contaminated soil or contained within a housing whereby water may perfuse through the bulk mineral cake.

In accordance with certain improved environmental remediation embodiments of the present invention, we propose the novel concept of adding at least one source of hydroxyapatite (HA) or hydroxylapatite (such as synthetic and/or natural hydroxyapatite, preferably PIMS minerals, more preferably ground fish bone or meal) to a high surface area polymer structure, preferably a porous polymer membrane, more preferably a microporous polyolefin membrane (flat sheet or hollow fiber), most preferably a microporous polyethylene membrane utilizing PIMS minerals as a filler, preferably as a partial substitution for the silica filler component of a silica filled microporous polyethylene membrane. The hydroxyapatite mineral filled membrane can be used as a filter medium, packing, liner, or the like to facilitate removal of heavy metals from contaminated liquids such as water.

In accordance with at least selected embodiments of the present invention, new or improved batteries, separators, components, and/or compositions have heavy metal removal capabilities via chemically active properties provided by one or more chemically active or reactive, natural or synthetic, mineral fillers, particles, coatings, agents, and the like, preferably bio-minerals from bone or teeth, more preferably fish bone or meal. Such new or improved batteries, separators, components, and/or compositions have advantages of low cost of raw material, lead removal, reducing the need for sodium sulfate, extending battery warranty, use of recycled or industrial waste or by products, and/or the like.

In accordance with at least selected embodiments of the present invention, we have:
- Incorporated a material compatible with current separator production processes into battery separators to systematically bind Pb in solution and reduce the occurrence of hydration shorts over the battery service life.
- Incorporated a material from common (and renewable) sources:
  - Fish (Most efficient at low to very low pH)
    - Bones
    - Scales
  - Crustaceans (Functional range similar to fishmeal)
    - Exoskeleton
  - Shellfish (Most efficient in basic conditions above pH 8.5)
    - Shell
  - Beef (Functional range similar to fish meal)
    - Bones
  - Peat (Functional range near neutral pH)
    - Humus, decayed vegetative matter.
  - Tea Waste (Functional range near neutral pH)
    - By-products of tea manufacturing, stems, undesired leaves.
- Identified possibly preferred fish meal as from "pelagic" fish species.
  - Small, bony fish often considered inedible by humans.
  - Shellfish may also make up a minor component.
  - Fish meal is essentially the bone and scale after purification, wash, dry and grinding.
    - Typically between 4 and 6% residual oil remains with the fishmeal.
    - The fishmeal is comprised of the mineral Apatite w/ formula:
      $Ca_{10-x}Na_x(PO_4)_{6-x}(CO_3)_x(OH)_2$ In accordance with at least selected possibly preferred embodiments, the present invention is directed to battery separators having one or more PIMS minerals as a filler component, battery separators having one or more fish bone or fish meal fillers, polyethylene and silica battery separators having fish bone powder substituted for at least a portion of the silica filler, and/or methods of manufacture or use thereof.

An exemplary lead acid battery, for example, a flooded lead acid SLI battery, includes a negative plate (electrode) and a positive plate (electrode) with a separator sandwiched there between. These components are housed within a container that also includes terminal posts, vents, and gangvent plugs. In accordance with a preferred embodiment, the separator has transverse ribs on the surface that faces negative plate and has longitudinal ribs on the surface that faces the positive plate (see, for example, FIGS. 5 and 26). Although a particular battery is shown in FIG. 31, the inventive separator may be used in many different types of batteries or devices including for example, but not limited to, sealed lead acid, flooded lead acid, ISS lead acid, combined battery and capacitor units, other battery types, capacitors, accumulators, and/or the like.

Figure 5:
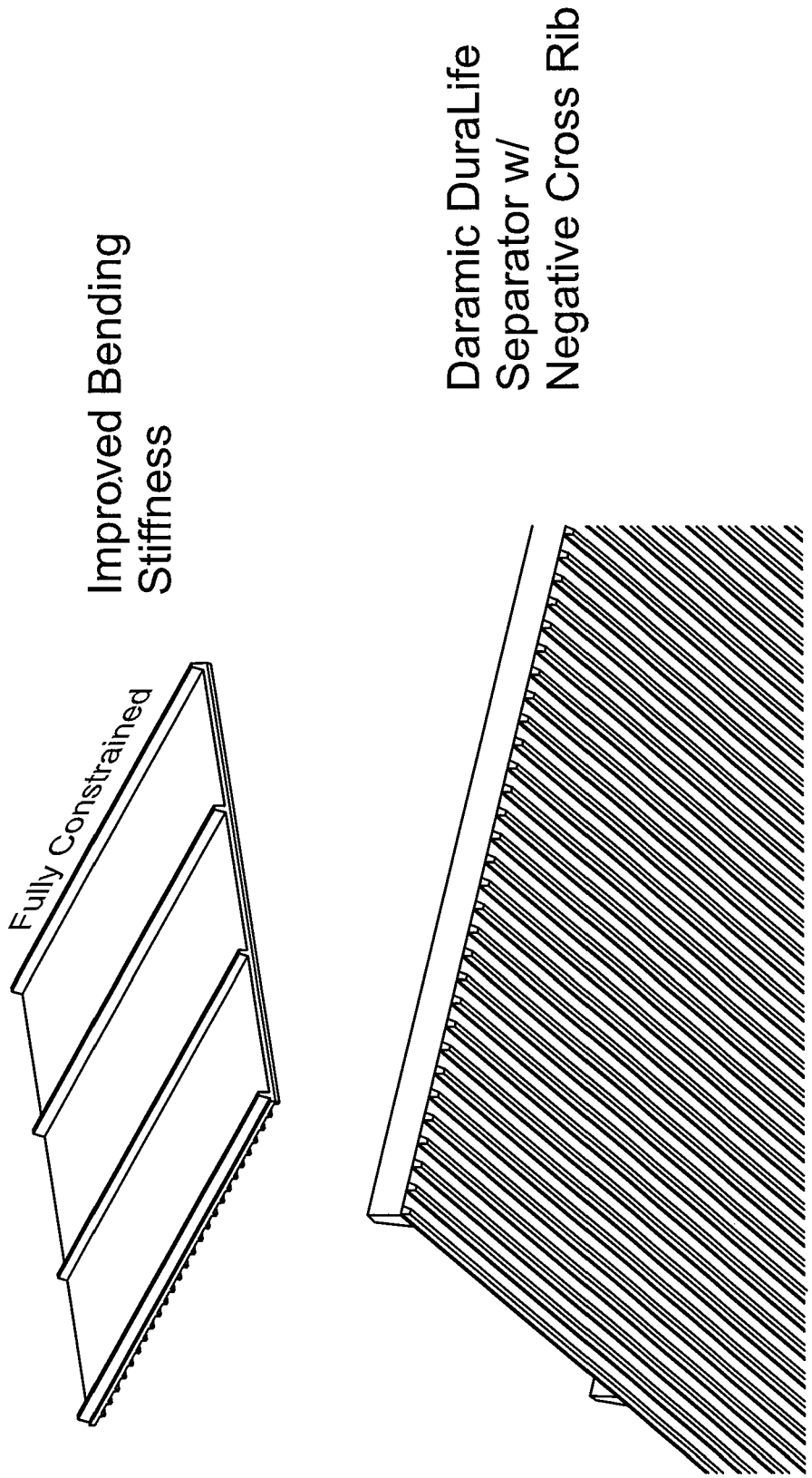
Figure 6:
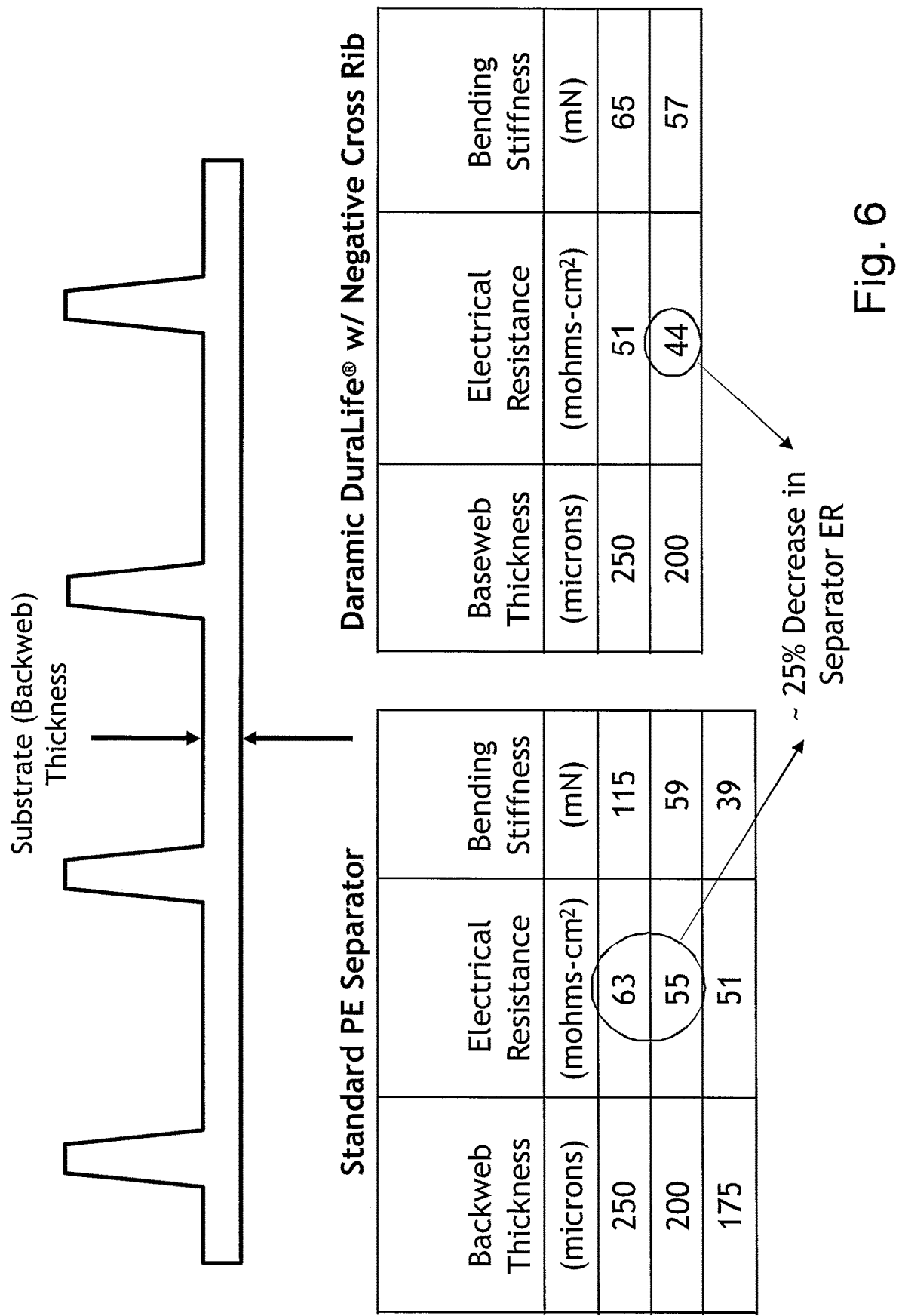
Figure 26:
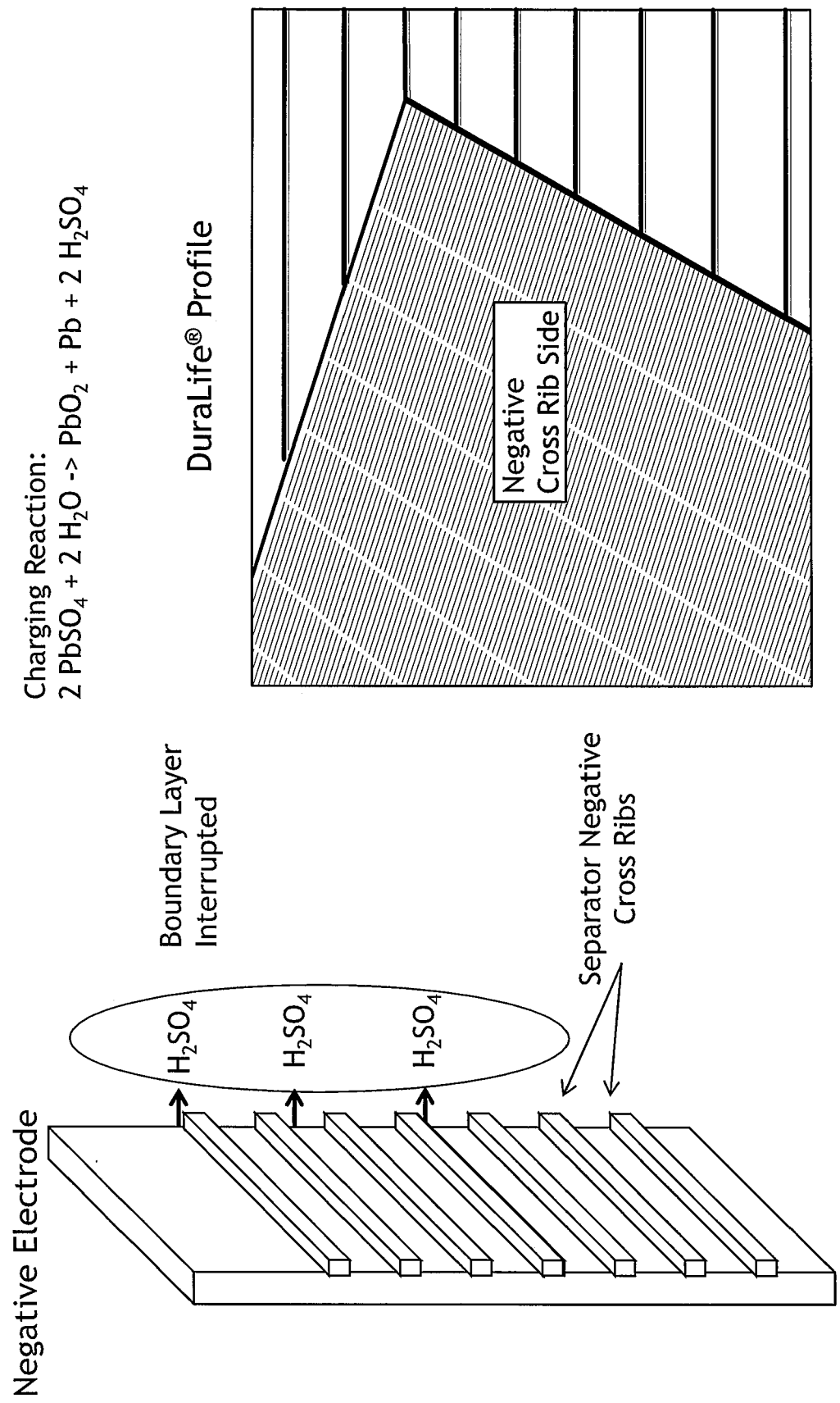

The possibly preferred separator of FIGS. 5 and 26, is preferably a porous polymer membrane (such as a microporous polyethylene membrane having pores less than about 1 micron). Nevertheless, the inventive separators may be microporous or macroporous membranes (having pores greater than about 1 micron) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The possibly preferred microporous membranes may have pore diameters of about 0.1 micron (100 nanometers) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultrahigh molecular weight polyethylene (UHMWPE), and polypropylene. One preferred embodiment may include a mixture of filler (for example, silica and/or reactive mineral) and UHMWPE. In general, the preferred separator precursor may be made by mixing, in an extruder, about 30% by weight filler with about 10% by weight UHMWPE, and about 60% processing oil. The mixture may also include minor amounts of other additives or agents as is common in the separator arts (such as wetting agents, colorants, antistatic additives, and/or the like) and is extruded into the shape of a flat sheet. The ribs are preferably formed by the engraved surfaces of opposed calender rollers. Thereafter, much of the processing oil is extracted, and the microporous membrane is formed.

With reference again to FIGS. 5 and 26 of the drawings, in accordance with one particular example, the negative cross ribs are about 4 mils thick, the backweb is about 6 mils thick and the positive ribs are about 20 mils thick (total separator thickness about 30 mils). The preferred separator may be a cut piece or leaf separator (of FIG. 33) or a wrapping, envelope, pouch, pocket, with or without an optional laminate (see FIG. 27), glassmat (of FIG. 33), or synthetic non-woven, and may have minor transverse cross-ribs on the opposite face of the separator as the major longitudinal ribs.

The transverse cross-ribs on the opposite face of the separator as the longitudinal ribs increase stiffness and protection of the sheet allowing for reduction of mass of the back-web, reduced ER, reduced cost, and increased physical properties such as may be required for high speed production and assembly (including high speed separator, envelope, and/or battery production and/or assembly). Such separators or precursors can be produced in rolls, envelopes (or pockets) and pieces, and may be used where processing of separators by high speed automation or hand assembly is utilized and high productivity is desired.

Also, the mass of the separator can be reduced while maintaining physical properties needed for processing and performance inside the battery by adding transverse or cross ribs opposite, for example, the major longitudinal ribs. The mass of the major rib is preferably reduced when the cross ribs are added to the opposite side to achieve the desired overall separator thickness (major rib+backweb+cross rib). The sheet can also be reduced in thickness and/or mass while maintaining productivity properties such as rigidity as well as protecting the sheet from abrasion and oxidation rips and tears during the life of the battery by adding transverse or cross ribs.

In accordance with at least one example or embodiment, small, tightly spaced transverse ribs are added to the side of the lead acid separator which contacts the negative electrode (preferably in addition to major ribs on the positive side). The small, tightly spaced negative transverse ribs can be in many different forms, including without limitation, sinusoidal, diagonal or straight rib patterns, that are continuous or discontinuous. For ease of processing, rounded straight ribs may be preferred.

The positive longitudinal major ribs can take many forms that run substantially in the longitudinal directional, for example, sinusoidal, diagonal or straight ribs, which are continuous or discontinuous. For ease of processing, rounded straight ribs may be preferred. In certain battery designs, often referred as the Japanese Design, there are no positive ribs, instead they are replaced with a heavy glass-mat laminated to the flat positive face of the separator. In this glass-mat positive face separator embodiment, the transverse negative ribs of the present invention function in the same fashion as the embodiments with positive longitudinal ribs. The positive face may be smooth or flat, have projections, have ribs, or have a nonwoven bonded or laminated thereto. Such nonwoven materials may be formed of synthetic, natural, organic or inorganic materials or blends, such as fiberglass, polyester (PET), recycled PET, or combinations thereof (with or without the inventive reactive minerals). The separator may be a cut piece separator or a wrap, envelope, pouch, or pocket type separator.

With regard to at least selected particular embodiments or examples of separators, the preferred separator has the following:

1) Transverse Rib Height—preferably between about 0.02 to 0.30 mm, and most preferably between about 0.075 to 0.15 mm.
2) Sheet (Substrate) Thickness—preferably between about 0.065 to 0.75 mm.
3) Overall Thickness (positive rib+backweb+negative rib)—overall thickness of the separator preferably between about 0.200 to 4.0 mm.
4) Mass Reduction—preferably greater than 5%, more preferably greater than 10%. The transverse ribs increase the transverse rigidity of the separator and allow for the backweb or substrate thickness to be decreased. Mass can be removed from both the backweb and positive ribs while maintaining and increasing the transverse rigidity. Also, the transverse negative ribs contribute to overall thickness of the separator. Therefore the height of the longitudinal positive rib can be directly reduced by the height of the negative cross rib.
5) Type of Separator—the separator can be made of porous materials, such as microporous or macroporous thermoplastic material, preferably polyethylene, polypropylene, polyvinyl chloride, and the mixtures thereof, as well as of rubber, polyolefin, phenolic, crosslinked phenolic resin, cellulosic, glass, or combinations thereof.

Additional or alternative benefits of the addition of negative cross ribs include:

1) Electrical Resistance Reduction—Since the negative cross rib profile design allows for mass removal while maintaining equivalent or higher transverse bending stiffness, the observed electrical resistance will preferably be lower.
2) Minimize Tear Propagation—When the separator is extremely oxidized, a crack or split will likely develop in the backweb and extend parallel to the major longitudinal rib. The negative cross rib will preferably arrest the propagation of such tears due to, for example, the extra mass in the ribs.
3) Side Alignment—In the assembly process, the enveloped plates are aligned horizontally and vertically before the strap is cast to connect the positive and negative electrodes respectively. For vertical alignment, the positive ribs provide a means for the separator and plate to slide when contacting each other. For typical side alignment, the negative plate may slide when contacting the flat backweb. The negative transverse ribs, will preferably offer less surface and should aid in side alignment operation.

In accordance with at least one embodiment, the separator is made up of an ultrahigh molecular weight polyethylene (UHMWPE) mixed with a processing oil and filler of precipitated silica and/or reactive mineral. In accordance with at least one particular embodiment, the negative cross ribs preferably have a 2 to 6 mil radius and a 10 to 50 mil rib spacing.

In accordance with at least selected embodiments, the battery separator includes a porous membrane having a backweb and at least two rows of positive ribs on the positive side of the backweb, and a plurality of negative cross ribs or transverse ribs on the negative side of the backweb. The positive ribs may be straight or wavy, may have a solid portion, and may have a truncated pyramidal shape. The membrane may be selected from the group of polyolefin, rubber, polyvinyl chloride, phenolic, cellulosic, or combinations thereof, and the membrane is preferably a polyolefin material forming a battery separator for a storage battery.

A battery separator is used to separate the battery's positive and negative electrodes, and is typically microporous so that ions may pass there through to the positive and negative electrodes. In lead/acid storage batteries, either automotive or industrial batteries, the battery separator is typically a microporous polyethylene separator having a back web and a plurality of positive ribs standing on the back web. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate (piece separator).

In one embodiment of the present method of making a lead/acid battery separator from a sheet of plastic material, the sheet is calender molded to form cross or negative side transverse ribs or projections, and preferably is calender molded to simultaneously form both positive longitudinal ribs and negative cross or transverse ribs on opposite sides of the sheet.

Once a battery is sufficiently charged and current is continually applied (i.e., overcharging), hydrogen is generated at the negative plate, and oxygen is generated at the positive plate. As hydrogen is formed at the negative plate, it may push the separator away from the negative plate thereby forming a gas pocket which may prevent the escape of gas. At least selected embodiments of the present invention may address this issue and provide an improved battery separator. For example, the negative cross ribs extending across the back or negative surface may be interrupted by flat areas, fissures or recesses behind each positive rib (see FIG. 26). The flats, fissures or recesses may form channels which may extend longitudinally and may provide for the escape of hydrogen gas, may allow for extraction of plasticizer or lubricant from the positive ribs, and/or the like. A separator having such channels that allow any hydrogen gas to escape may be preferred.

In at least one embodiment, the separator is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The separator sheet thickness may be approximately 0.10 to 0.50 mm, the height of the longitudinal ribs may be 0.3 to 2.0 mm and the height of the transverse ribs may be 0.1 to 0.7 mm, the longitudinal rigidity with 100 mm width may be approximately 5 mJ and the transverse rigidity may be approximately 2.5 mJ, and the total thickness of the separator may be less than 2.5 mm.

The separators according to the present invention can be manufactured in a similar fashion as conventional polyethylene separators with the addition or substitution of reactive mineral fillers, a negative roll having grooves to form the negative cross ribs, a positive roll having no grooves or grooves of less depth, and/or the like. In a preferred method, the plastic material containing filler is extruded through a slot die to form a film and then run through two calender rolls (positive roll, negative roll) by means of which both the positive longitudinal ribs and the negative transverse ribs are produced and the separator sheet is reduced to the desired thickness. The positive roll may have shallow circumferential or annular grooves which form the positive longitudinal ribs and lands or smooth areas or stripes that form smooth areas on the separator for sealing the edges of the pockets. The negative roll may have shallow axial grooves which form the cross ribs. Also, the negative roll may have spaced sets of shallow axial grooves with smooth lands or areas (for example, for welding zones) there between.

The separators according to the present invention with negative cross ribs preferably have a better machine workability than those without such transverse ribs, a better guidance of the separator tracks as a result of increased transverse rigidity, and the processability for placing the electrode plates in pockets should be improved because of the increased transverse rigidity. In addition, production of separators with a considerably reduced sheet thickness and consequently with a reduced electrical resistance should be possible which is of significance particularly in relation to efforts to constantly increase battery output with a constant battery volume. The separators according to the invention should be able to be processed to form pockets without difficulty on conventional machines. The additional transverse negative ribs should not cause problems either with the welding of the pockets by the use of heat or ultrasonic means or with the mechanical process for producing pockets.

In at least one particular embodiment, the separator made of elastic plastic and suitable for use in a lead acid storage battery, includes sheet material with an inner region and two peripheral regions and having positive ribs running in the longitudinal direction with the longitudinal ribs in the inner region being more widely spaced than those in the peripheral region, and having negative ribs running in the transverse direction.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least one of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least two of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least three of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and at least four of the housing, separator, positive electrode, negative electrode, and electrolyte include at least one natural or synthetic hydroxyapatite mineral.

A new or improved lead acid battery may preferably include: a housing containing a positive electrode spaced apart from a negative electrode with a porous separator located between the positive electrode and the negative electrode and an electrolyte in ionic communication between the positive electrode and the negative electrode, and each of housing, separator, positive electrode, negative electrode, and electrolyte include at least one natural or synthetic hydroxyapatite mineral.

The new or improved separators of the present invention may find use as Lead-Acid Battery Separators, separators for use in starting, deep-cycling and stand-by power battery applications, or in Flooded, Gel and AGM battery types used in applications such as: starting, stationary, motive power and deep-cycle lead-acid battery applications, as well as for flooded and specialty lead-acid battery applications, and/or for premium lead-acid gel batteries. Further, such separators may be used in other batteries, accumulators, capacitors, and/or the like.

In accordance with at least certain embodiments, it is preferred that at least one source of hydroxyapatite mineral (such as ground fish meal) be added to substitute for a portion of the silica filler in a silica filled separator at substitution levels of about 1% to 50% of the silica, more preferably about 5% to 30%, and most preferably at about 10% to 20%.

In accordance with at least other certain embodiments, it is preferred that at least one source of hydroxyapatite (such as ground fish meal) be added as the filler in a filled separator at filler levels of about 1% to 75% filler, more preferably about 5% to 50%, and most preferably at about 10% to 30%.

In accordance with at least still other certain embodiments, it is preferred that at least one source of hydroxyapatite (such as ground fish meal) be added as filler in a battery separator at levels of about 1% to 75% weight percent of the separator, more preferably about 2% to 35%, and most preferably at about 5% to 20%.

In accordance with at least selected embodiments of the present invention, a believed novel concept of utilizing PIMS minerals as a filler component within a microporous lead-acid battery separator is provided. In accordance with one particular embodiment or example, the PIMS mineral (preferably fish meal, a bio-mineral) is provided as at least a partial substitution for the silica filler component in a silica filled lead acid battery separator (preferably a polyethylene/silica separator formulation).

In accordance with at least certain embodiments of the present invention, a novel concept of utilizing one or more natural or synthetic PIMS minerals as a filler component within a microporous lead-acid battery separator is provided. In accordance with more particular embodiments or examples, a PIMS mineral (preferably fish meal, a bio-mineral) is provided as at least a partial substitution for the silica filler component in a silica filled lead acid battery separator (preferably a polyethylene/silica separator formulation). In accordance with at least selected embodiments, the present invention is directed to new or improved batteries, separators, components, and/or compositions having heavy metal removal capabilities and/or methods of manufacture and/or methods of use thereof.

In accordance with at least selected embodiments of the present invention, a believed novel concept of utilizing PIMS minerals as a filler component within a microporous PE ISS lead-acid battery separator is provided. In accordance with one particular embodiment or example, the PIMS mineral (preferably fish meal, a bio-mineral) is provided as at least a partial substitution for the silica filler component in a silica filled lead acid battery separator (preferably a polyethylene/silica separator formulation).

A common failure mode within the lead-acid battery industry is the phenomenon of "hydration shorts". The conventional approach to the prevention of hydration shorts consists of addition of Sodium Sulfate (Na2SO4) to the electrolyte solution during battery manufacture. This approach requires an additional manufacturing step, adding complexity to the battery processing. Sodium Sulfate addition acts to "hinder" hydration shorts.

In accordance with the present invention, a variety of PIMS minerals have been identified; some of which have been evaluated for lead affinity. A PIMS mineral derived from fish bone (such as commercial, lab ground fish meal) has been shown to have greatest affinity for lead ion over the other natural or synthetic samples evaluated.

In accordance with at least selected embodiments, lead reduction is achieved by incorporating PIMS minerals in ISS lead-acid battery separators, preferably incorporating PIMS mineral derived from fish bone.

In accordance with at least selected embodiments of the present invention, a believed novel concept of utilizing PIMS minerals as a filler component within a microporous ISS lead-acid battery separator is provided. In accordance with one particular embodiment or example, the PIMS mineral (preferably fish meal, a bio-mineral) is provided as at least a partial substitution for the silica filler component in contemporary silica filled lead acid battery separator (preferably a polyethylene/silica separator formulation).

In accordance with at least selected embodiments or objects of the present invention, there are provided:

An ISS battery separator having at least one of negative cross ribs, a silica to polymer ratio greater than 3:1, and one or more PIMS minerals as a filler component.

The above ISS battery separator, having one or more fish bone or fish meal fillers.

The above ISS battery separator, wherein the separator is a silica filled polyethylene battery separator having the fish bone or fish meal filler substituted for at least a portion of the silica filler.

In a flooded lead acid battery, the improvement comprising the above ISS battery separator.

In an ISS electrical system, the improvement comprising the above battery.

An ISS battery separator having multiple separator properties of charge acceptance, power delivery, reduced hydration shorts, improved cycle life, and reduced acid stratification optimized simultaneously.

In an ISS lead acid battery, the improvement comprising the above separator.

In an ISS vehicle, the improvement comprising the above battery.

A battery separator comprising at least three of the following improvements, features, changes, modifications, enhancements, performance, characteristics, profiles, shapes, configurations, structures, parts, attributes, spacing, thicknesses, ratios, blends, mixtures, formulations, additives, agents, coatings, layers, laminates, mats, non-wovens, surfaces, inclusions, effects, embodiments, or examples:

1) Charge Acceptance/Power Delivery—features of or changes to the separator to help increase charge acceptance/power delivery:
   a. Low or Lower Electrical Resistance (ER)—minimization of separator ER, via the following methods:
      i. Lower Back-Web (BW) Thickness—reduce the BW thickness from typical values which range from 150 to 250 micron by lowering the BW thickness between 75 to 150 microns and then reinforcing the transversal stiffness with the use of negative cross ribs,
      ii. Increase Silica to Polymer Ratio—increase the loading of silica, relative to the polymer content, have a silica to polymer ratio from about 3.0/1.0 to 5.0/1.0,
      iii. Utilize High Oil Absorption (High Surface Area) Silica (Increase Porosity)—include a silica with a high surface area (e.g. >200 m$^2$/g), which typically yields a high oil absorption, an amount of pore forming agent from about 70 to 80% by weight in the extrusion process.
   b. Minimize Gas Entrapment—reduce opportunity for gas entrapment:
      i. Laminate Structure and Modifications—modified laminate structure to reduce gas entrapment,
         1. Treatment of the laminate with a chemical or plasma to modify surface energy to shed gas bubbles,
         2. Perforation to allow bubbles an area to coagulate and escape the laminate matrix,
         3. Addition of nucleating agents,
         4. Changing the structure of the laminate during formation,
         5. Addition of polymer fibers and/or shaped polymer fibers to the laminate structure,
         6. Addition of wetting agents (or surfactants),
         7. Change the orientation on the fiber structure of the laminate so gas bubbles are less likely to attach to the structure,
         8. Minimize the thickness of the structure so that there are simply less sites for bubble adhesion, ii. Wetting Agent Selection—use a more hydrophobic wetting agent, use an ethoxylated fatty alcohol, iii. Separator Cross-Ribs (Negative and/or Positive)—have small negative cross ribs to assist in the nucleation or transport of gas bubbles or to allow the gas to escape from between the plates, or reducing the potential for gas entrapment, iv. Nucleation of Gas—have areas on the separator to act as nucleation sites for gas bubbles to quickly and efficiently grow to the point where they are released from the separator and travel out of the area between the plates, 1. Profile Shape (Roughness)—add nanostructures on the surface of the separator to increase gas nucleation, such nanostructures may take the form of pyramids, chevrons, or pillars, and may be formed by calendaring, laser ablation or controlled chemical oxidation, 2. Additives—have additives incorporated into the matrix of the separator (or on the surface) in order to provide areas on the surface where they change the surface structure or energy to encourage the nucleation of small gas bubbles generated to a critical volume, the additives may be carbon fibers, carbon nanotubes, or barium sulfate, 2) Hydration Shorts (Hinder, Delay, Reduce, Eliminate)—add sodium sulfate to the electrolyte to hinder hydration shorts, or a. Common Ion Effect—have sodium sulfate incorporated into the separator matrix and/or laminate materials (such as by impregnation), b. Heavy Metal Sequestration—sequester lead ions that are in solution by incorporating apatite, hydroxyapatite minerals, ground fish meal, zeolites, lignins, latex, or rubber-derivatives into the separator (or on the separator surface, in the laminate material, in the electrolyte, in the battery casing, and/or the like) to inhibit hydration short formation, c. Location of Additives—have additives in the matrix of the separator (preferably as a substitution filler for part of the silica), coated on the separator, coated on or contained in the laminate structure, coated onto the container of the battery case either before or after the injection molding process, or placed in porous bags or sachets in the electrolyte or laminate structure, d. Lower or Reduced Acid Displacement—via separator modifications including:

i. Thin Backweb—lower the backweb (BW) thickness with added cross ribs (preferably negative cross ribs as discussed above), higher porosity, or less rib mass of the separator, ii. Serrated/Battlement Ribs—use serrated or battlement rib design to remove mass from the ribs, 3) Improve Cycle Life—by modifying the separator as follows:

a. Laminate Structure—utilize a laminate to retain the positive active mass in the positive grid, i. Glass Mat—utilize glass mats having different fiber lengths and widths in the mats ranging in compressed thickness from 0.1 mm to 1.0 mm, ii. Synthetic Nonwovens—utilize nonwoven polymeric mats, polyester mats, iii. Hybrid—utilize a hybrid mat of glass fibers mixed with polymer fibers, b. Profile Selection—contribute to lower acid displacement by profile design selection, use a profile having tight rib spacing with shorter rib height, narrower ribs, or battlement ribs, c. Polyaspartic Acid—add polyaspartic acid directly to the matrix of the separator, or as coated on the separator, coated on or contained in the laminate structure, coated onto the container of the battery case either before or after the injection molding process, placed in porous bags or sachets in the electrolyte or laminate structure, d. Compression—use a compressible, flexible or resilient rib structure to enhance cycle life, such as an I-beam rib profile, 4) Acid Stratification—overcharge the battery to some degree promote the electrolysis of water, or a. Profile Selection—incorporate horizontal ribs across the surface of the separator, b. Laminate Structure—add a laminate structure attached to the polyethylene separator, align the fibers in a certain pattern across and through the material, add a laminate structure to both the positive and negative face of the polyethylene separator, c. Surface Area—increase the surface area of the separator structure, decrease the fiber diameter of the laminate structure, or increase the internal surface of the separator by the type or concentration of silica, adding porosity, having cross ribs, d. Acid Immobilization—immobilize the acid by having cross ribs which tend to hold the acid in place, adding a silica layer on the laminate and/or separator surface or adding silica in the laminate to "gel" the acid, or utilizing Daramic AJS technology, e. Polyethylene/Absorptive Glass Mat Hybrid—incorporate a flat PE separator membrane into or on one side of an AGM separator, and f. Other Laminate Hybrids—utilize other laminate systems, whether nonwovens or other glass mats in conjunction with a flat PE separator membrane to make an acceptable separator.

The above separator, having negative cross ribs.

In a lead acid battery, the improvement comprising the above separator.

A battery separator, such as a deep cycle, ISS or micro-hybrid separator, comprising at least two of the following: features that help minimize acid stratification, that occupies approximately 15% less volume than traditional separators, has negative cross ribs, has a multitude of small mini-ribs in the horizontal direction, has a mechanical barrier that will hinder an acid gradient from developing, has hundreds of mini dams to keep heavier acid from flowing downward, has hundreds of mini dams which create hundreds of mini pools of acid uniformly across the surface of the electrode, and that improves power delivery and reduces acid stratification in micro-hybrid batteries.

In a method of producing a silica filled battery separator, the improvement comprising: substituting at least one PIMS mineral for at least a portion of the silica filler.

In a lead acid battery, the improvement comprising at least one of: a separator, component, or composition having heavy metal removal capabilities utilizing at least one PIMS mineral; a battery casing, battery part, porous bag, laminate, non-woven, mat, paper, coating, surface, in-mold, filler, electrode, electrode formulation, electrolyte, polymer composition, or resin composition having heavy metal removal capabilities utilizing at least one PIMS mineral; a polymer or resin composition having heavy metal removal capabilities utilizing at least one PIMS mineral as at least one filler component therein; a silica filled microporous lead-acid battery separator having at least one PIMS mineral provided as at least a partial substitution for the silica filler therein; a silica filled microporous polyethylene lead-acid battery separator having ground fish meal provided as at least a partial substitution for the silica filler therein; or combinations thereof.

The present invention may be embodied in other forms without departing from the spirit and the essential attributes thereof, and, accordingly, reference should be made to the appended claims, rather than to the foregoing specification, as indicating the scope of the invention.

The invention claimed is:

1. A membrane for an acid-containing battery, the membrane in the shape of a flat sheet, and wherein the membrane comprises a polymer, oil, and a filler comprised of silica and fish meal, wherein the filler comprises 10-50% fish meal, and the silica has a surface area greater than 200 $m^2/g$.

2. The membrane of claim 1, wherein the membrane is a microporous polyolefin membrane.

3. The membrane of claim 2, wherein the polymer is a polyolefin.

4. The membrane of claim 3, wherein the silica to polymer ratio is from 3.0/1.0 to 5.0/1.0.

5. The membrane of claim 3, wherein the silica to polymer ratio is from 3.0/1.0 to 4.0/1.0.

6. The membrane of claim 1, wherein the membrane is a macroporous membrane, wherein the polymer is one or more selected from rubber, PVC, synthetic wood pulp (SWP), glass fibers, cellulosic fibers, polypropylene, and combinations thereof.

7. The membrane of claim 1, having an overall thickness of 0.200 mm to 4.0 mm.

8. The membrane of claim 1, further comprising a material having heavy metal removal capabilities.

9. The membrane of claim 8, wherein the material is one or more selected from an apatite mineral, a hydroxyapatite mineral, ground fish meal, zeolites, lignins, latex, and rubber-derivatives.

10. The membrane of claim 9, wherein the material is latex.

11. The membrane of claim 9, wherein the material is a rubber-derivative.

12. The membrane of claim 1, further comprising nucleation additives in or on a surface of the membrane.

13. The membrane of claim 12, wherein the nucleation additives comprise one or more selected from carbon fiber, carbon nanotubes and barium sulfate.

14. The membrane of claim 1, wherein the polymer is polyethylene and the membrane further comprises a wetting agent.

15. The membrane of claim 14, wherein the wetting agent is hydrophobic.

16. The membrane of claim 15, wherein the wetting agent is an ethoxylated fatty alcohol.

17. The membrane of claim 1, comprising one or more of the following properties:
 an average pore size of 0.1 microns;
 a maximum pore size <1 microns;
 an Electrical Resistance less than 0.065 (Ohm cm sq); and
 a porosity of 60% to 80%.

18. The membrane of claim 17 having at least two of the properties.

19. A membrane for an acid-containing battery, the membrane in the shape of a flat sheet, and wherein the membrane comprises polymer, oil, and a filler comprised of silica and fish meal, wherein the filler comprises 50% fish meal, and the silica has a surface area greater than 200 $m^2/g$.

20. The membrane of claim 19, further comprising at least one material having heavy metal removal capabilities selected from the group consisting of an apatite mineral, a hydroxyapatite mineral, ground fish meal, zeolites, lignins, latex, and rubber-derivatives.

* * * * *